(12) United States Patent
Wang et al.

(10) Patent No.: US 11,271,937 B2
(45) Date of Patent: Mar. 8, 2022

(54) METHOD AND NODES FOR HANDLING ACCESS TO EPC SERVICES VIA A NON-3GPP NETWORK

(71) Applicant: Telefonaktiebolaget LM Ericsson (publ), Stockholm (SE)

(72) Inventors: Chunbo Wang, Shanghai (CN); Daniel Nilsson, Älvängen (SE); Stefan Rommer, Västra Frölunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 210 days.

(21) Appl. No.: 15/572,981

(22) PCT Filed: May 12, 2015

(86) PCT No.: PCT/CN2015/078784
§ 371 (c)(1),
(2) Date: Nov. 9, 2017

(87) PCT Pub. No.: WO2016/179800
PCT Pub. Date: Nov. 17, 2016

(65) Prior Publication Data
US 2018/0145982 A1 May 24, 2018

(51) Int. Cl.
*G06F 7/04* (2006.01)
*G06F 15/16* (2006.01)
(Continued)

(52) U.S. Cl.
CPC ...... *H04L 63/0892* (2013.01); *H04L 63/0884* (2013.01); *H04W 12/062* (2021.01);
(Continued)

(58) Field of Classification Search
CPC .......... H04L 63/0892; H04L 63/0884; H04W 36/14; H04W 88/16; H04W 8/04
See application file for complete search history.

(56) References Cited

U.S. PATENT DOCUMENTS

| 8,270,978 | B1 | 9/2012 | Faccin et al. |
| 2003/0145091 | A1* | 7/2003 | Peng .................. H04L 63/0823 |
| | | | 709/229 |

(Continued)

FOREIGN PATENT DOCUMENTS

| CN | 1726727 A | 1/2006 |
| CN | 101459904 A | 6/2009 |

(Continued)

OTHER PUBLICATIONS

"Angelos Michalas, Aggeliki Sgora, Dimitrios D. Vergados, LTE-A interworking for seamless service provisioning, Jul. 28-30, 2014, IEEE, INSPEC# 14663416" (Year: 2014).*

(Continued)

*Primary Examiner* — Phy Anh T Vu
(74) *Attorney, Agent, or Firm* — Rothwell, Figg, Ernst & Manbeck, P.C.

(57) ABSTRACT

The embodiments herein relate to a method performed by a PGW (108) for handling a UEs (101) access to an EPC service via a non-3GPP access network (103). During a request for connecting the UE (101) to the non-3GPP access network (103), the PGW (108) receives identity information which indicates an identity of an AAA node (710) from a non-3GPP access gateway (705). The PGW (108) selects the AAA node (710) which was indicated in the received identity information. The PGW (108) transmits, to the selected AAA node (710), a request message for the UE (101). The request message is a request for authorization of the UE (101) to access the EPC service via the non-3GPP access network (103).

25 Claims, 16 Drawing Sheets

(51) Int. Cl.
  *H04L 29/06* (2006.01)
  *H04W 88/16* (2009.01)
  *H04W 36/14* (2009.01)
  *H04W 12/062* (2021.01)
  *H04W 8/06* (2009.01)
  *H04W 8/04* (2009.01)

(52) U.S. Cl.
  CPC ......... *H04W 36/14* (2013.01); *H04W 88/16* (2013.01); *H04W 8/04* (2013.01); *H04W 8/06* (2013.01)

(56) References Cited

U.S. PATENT DOCUMENTS

| | | | | |
|---|---|---|---|---|
| 2004/0090937 | A1* | 5/2004 | Chaskar | H04W 36/0011 370/331 |
| 2004/0105431 | A1* | 6/2004 | Monjas-Llorente | H04L 63/1458 370/352 |
| 2006/0077924 | A1* | 4/2006 | Rune | H04L 63/08 370/328 |
| 2007/0127495 | A1* | 6/2007 | de Gregorio | H04W 12/06 370/395.52 |
| 2007/0204048 | A1* | 8/2007 | Zhang | H04L 63/0892 709/227 |
| 2008/0057906 | A1* | 3/2008 | Lee | H04L 63/0892 455/411 |
| 2008/0192697 | A1* | 8/2008 | Shaheen | H04W 36/0011 370/331 |
| 2009/0209229 | A1 | 8/2009 | Cai et al. | |
| 2009/0323635 | A1* | 12/2009 | Gras | H04W 36/0033 370/331 |
| 2010/0035578 | A1* | 2/2010 | Ahmed | H04W 12/0608 455/411 |
| 2010/0199332 | A1* | 8/2010 | Bachmann | H04L 63/0428 726/4 |
| 2011/0138005 | A1* | 6/2011 | Zhou | H04L 45/02 709/206 |
| 2011/0200007 | A1 | 8/2011 | Qiang | |
| 2012/0087345 | A1* | 4/2012 | Yan | H04W 36/0033 370/331 |
| 2013/0005332 | A1* | 1/2013 | Sedlacek | H04L 63/0892 455/426.1 |
| 2013/0115919 | A1* | 5/2013 | Xu | H04W 12/06 455/411 |
| 2013/0267203 | A1 | 10/2013 | Qiang | |
| 2013/0272163 | A1 | 10/2013 | Qiang | |
| 2014/0157395 | A1* | 6/2014 | Li | H04L 63/08 726/12 |
| 2015/0049749 | A1* | 2/2015 | Kall | H04M 15/80 370/338 |
| 2015/0092743 | A1* | 4/2015 | Ji | H04W 48/18 370/331 |
| 2015/0117406 | A1* | 4/2015 | Kim | H04W 36/0022 370/331 |
| 2015/0373617 | A1* | 12/2015 | Cho | H04W 40/12 370/329 |
| 2016/0007257 | A1* | 1/2016 | Kim | H04W 76/34 370/331 |
| 2016/0150439 | A1* | 5/2016 | Drevon | H04W 28/0268 370/230 |
| 2018/0027414 | A1* | 1/2018 | Li | H04W 12/06 455/435.1 |
| 2018/0227760 | A1* | 8/2018 | Foti | H04L 63/0884 |
| 2021/0274020 | A1* | 9/2021 | Wang | H04L 67/025 |

FOREIGN PATENT DOCUMENTS

| | | |
|---|---|---|
| CN | 101483922 A | 7/2009 |
| CN | 101730070 A | 6/2010 |
| CN | 101785270 A | 7/2010 |
| CN | 102065423 A | 5/2011 |
| CN | 103369502 A | 10/2013 |
| EP | 1 693 995 A1 | 8/2006 |
| EP | 2721872 A1 | 4/2014 |
| RU | 2 488 978 C2 | 7/2013 |
| WO | 2010/108355 A1 | 9/2010 |

OTHER PUBLICATIONS

"V.Bharathi, L. Nithyanandan, Traffic aware dynamic speed sensitive CAC for IMS based UMTS-WiMAX-WLAN overlay networks, Jul. 4-6, 2013, IEEE, INSPEC#14063525" (Year: 2013).*

Canadian Office Action issued in corresponding Canadian Application No. 2,985,663, dated Sep. 17, 2018, (5 pages).

3GPP; ETSI TS 129 273, V8.1.0, (Apr. 2009); Universal Mobile Telecommunications System (UMTS); LTE; Evolved Packet System (EPS); 3GPP EPS AAA interfaces (3GPP TS 29.273 version 8.1.0 Release 8), pp. 1-97.

Caloun, P. et al., "Diameter Base Protocol", Network Working Group, RFC 3588, Sep. 30, 2003, pp. 1-147.

Extended European Search Report dated Oct. 19, 2018, issued for European patent application No. 15891503.3, 7 pages.

3GPP TS 29.273, V10.12.0, (Dec. 2014); 3rd Generation Partnership Project; Technical Specification Group Core Network and Terminals; Evolved Packet System (EPS); 3GPP EPS AAA interfaces (Release 10), 121 pages.

International Search Report and Written Opinion issued in International Application No. PCT/CN2015/078784, dated Feb. 14, 2016, 7 pages.

Alcatel-Lucent et al., "Pseudo-CR on 3GPP network implications, 3GPP AAA Server Case", 3GPP TSG CT4 Meeting #68bis, C4-150544, Bratislava, Slovakia, Apr. 13-17, 2015, 2 pages.

Examination Report dated Jan. 24, 2020 issued in Indian Patent Application No. 201737042594. (7 pages).

* cited by examiner

METHOD AND NODES FOR HANDLING ACCESS TO EPC SERVICES VIA A NON-3GPP NETWORK

CROSS REFERENCE TO RELATED APPLICATION(S)

This application is a 35 U.S.C. § 371 National Stage of International Patent Application No. PCT/CN2015/078784, filed May 12, 2015, designating the United States, the disclosure of which is incorporated by reference.

TECHNICAL FIELD

Embodiments herein relate generally to a Packet data network GateWay (PGW), a method in the PGW, a non-Third Generation Partnership Project (non-3GPP) access gateway, and a method in the non-3GPP access gateway. More particularly the embodiments herein relate to handling a User Equipment's (UE) access to an Evolved Packet Core (EPC) service via a non-3GPP access network.

BACKGROUND

3GPP TS 23.402 V13.1.0 (2015-03) defines the procedure of a non-3GPP Packet Data Network (PDN) connection set up including initial attach and handover between 3GPP and non-3GPP networks.

Before describing the non-3GPP connection setup in more detail, an architecture reference model will be described with reference to FIG. 1. In particular, FIG. 1 illustrates a roaming architecture for the Evolved Packet System (EPS). FIG. 1 illustrates an example embodiment of a communication system 100 which comprises a Home-Public Land Mobile Network (H-PLMN) 100*h* and a Visited-Public Land Mobile Network (V-PLMN) 100*v*. The H-PLMN 100*h* is the home network of a UE 101 (not shown in FIG. 1, but the reference number 101 is used for referring to the UE in other figures described below). The UE 101 can visit the V-PLMN 100*v*. The borders between the H-PLMN 100*h*, the V-PLMN 100*v* and the non-3GPP networks 103 are indicated with horizontal dotted lines in FIG. 1. In the following, the letter v used in a reference number indicates the visited network (i.e. the V-PLMN 100*v*) and the letter h used in a reference number indicates the home network (i.e. the H-PLMN). Similarly, when the capital letter V is used in relation to a node in the communications system 100, it refers to a node located in the visited network (i.e. the V-PLMN 100*v*) and the capital letter H refers to a node located in the home network (i.e. the H-PLMN 100*h*).

In FIG. 1, the V-PLMN 100*v* comprises a 3GPP access network 102. The 3GPP network 102 indicated with a circle represents a collection of functional entities and interfaces for the purpose of pictorial simplification of the architectural model in FIG. 1. FIG. 1 further illustrates non-3GPP access networks 103 which may comprise at least one of a trusted non-3GPP network 104 and an untrusted non-3GPP network 105. The UE 101 can visit the non-3GPP access networks 103 such as the trusted non-3GPP network 104 and the untrusted non-3GPP network 105. The trusted non-3GPP network 104 may also be referred to as a trusted non-3GPP Internet Protocol (IP) network and the untrusted non-3GPP network 105 may be referred to as an untrusted non-3GPP IP network. A trusted non-3GPP network 104 may be a network that the network operator considers trustable from a security stand point or that is considered trustable based on an operator policy. An untrusted non-3GPP network 105 may be a network that the network operator does not consider to not be trustable from a security stand point or that is considered not to be trustable based on an operator policy. Untrusted non-3GPP accesses are connected to the network via e.g. an evolved Packet Data Gateway (ePDG), which provide additional security mechanisms (IP security (IPsec) tunneling).

A 3GPP access network 102 is a 3GPP network applying a 3GPP access technology (also referred to as 3GPP access) specified by the 3GPP. Examples of an access technology may be General Packet Radio Services (GPRS), Universal Mobile Telecommunications System (UMTS), Enhanced Data Rates for GSM Evolution (EDGE), High Speed Packet Access (HSPA), Long Term Evolution (LTE) and LTE Advanced. GSM is short for Global System for Mobile Communications. A non-3GPP access network 103 is a network applying an access technology which is not specified by the 3GPP. Examples of a non-3GPP access network 103 may be Code Division Multiple Access (CDMA) 2000, Wi-Fi, Wimax, WLAN or fixed networks.

Thus, the term 3GPP access may refer to the radio technology that is used and defined by 3GPP (e.g. LTE, WCDMA etc.). The term 3GPP access network may refer to the Radio Access Network (RAN) which applies the 3GPP accesses, e.g. including base stations, Radio Network Controller (RNC) etc.

The H-PLMN 100*h* comprises a Home Subscriber Server (HSS) 106, a PGW 108, an Authentication, Authorization, Accounting (AAA) server 110, a Home-Policy and Charging Rules Function (H-PCRF) 112*h* and Operator's IP Services 115. Note that the H-PLMN 100*h* may comprise other and additional entities than the ones illustrated in FIG. 1. The PGW 108 may in some embodiments be located in the V-PLMN 100*v* instead of the H-PLMN 100*h*. In some embodiments, the AAA server 110 may be referred to as a 3GPP AAA server. In some embodiments, the communications system 100 may comprise a Home Location Register (HLR) or any other suitable subscriber database instead of the HSS 106.

An AAA server 110 is an entity which performs AAA functions such as authorization, policy enforcement, transmission of routing information, charging. For example, the AAA server 110 retrieves authentication information and subscriber profile, authenticates a UE 101, communicates authorization information to the non-3GPP access network 103 e.g. via an AAA proxy, registers the AAA server address or name with the HSS 106 for each authenticated and authorized UE 101 etc. In some embodiments, the AAA server 110 may acts as an AAA proxy server. In other embodiments, there may be a separate AAA proxy server which will be described in more detail below.

The Operator's IP Services 115 may also be referred to as a PDN. The packet data network may be an operator external public or private packet data network or an intra-operator packet data network, e.g. for provision of IP Multimedia Subsystem (IMS) services.

The V-PLMN 100*v* comprises a Mobility Management Entity/Serving General packet radio service Support Node (MME/SGSN) 118, a Serving GateWay (SGW) 120, a Visited-Policy and Charging Rules Function (V-PCRF) 112*v*, an ePDG 125 and an AAA proxy 128. The term MME/SGSN 118 refers to either an MME node, or a SGSN node or a node where the MME and the SGSN are co-located in one node, i.e. a combined MME and SGSN node.

The AAA proxy 128 is an entity which is configured to handle roaming cases. The AAA proxy 128 may act as a stateful proxy. The AAA proxy 128 performs functions such as e.g. relaying the AAA information between the non-3GPP access network 103 and the AAA Server 110, enforcing policies derived from roaming agreements etc. As mentioned above, the AAA proxy 128 may be a separate physical network node, it may reside in the AAA server or any other physical network node. In some embodiments, the AAA proxy 128 may be referred to as a 3GPP AAA proxy.

The HSS 103 in the H-PLMN 100h is arranged to be connected to the MME/SGSN 118 in the V-PLMN 100v and to the AAA server 110 in the H-PLMN 100h. The PGW 108 in the H-PLMN 100h is arranged to be connected to the H-PCRF 112h in the H-PLMN 100h and to the SGW 120 in the V-PLMN 100v. The H-PCRF 112h in the H-PLMN 10h is arranged to be connected to the PGW 108 in the H-PLMN 100h and to the Operator's IP Services 115 in the H-PLMN 100h.

At least some of the HSS 106, the PGW 108, the AAA server 110, the H-PCRF 112h, the V-PCRF 112v, the MME/SGSN 118, the SGW 120, the ePDG 125 and the AAA proxy 128 may be located in the core network, e.g. the EPC. With at least some of these nodes, the EPC provides services such as handling of data, voice and SMS to and from the UE 101. The EPC may be referred to as a 3GPP network and includes the core network parts rather than the radio access network parts (radio network access parts are included in the 3GPP access network 102, and a UE 101 typically communicates via a RAN to one or more CNs).

S2a is the interface which provides the user plane with related control and mobility support between the trusted non-3GPP network 104 and the PGW 108. S2b is the interface which provides the user plane with related control and mobility support between the ePDG 125 and the PGW 108. S6a is the interface between the MME/SGSN 118 and the HSS 103 for authentication and authorization. S6b is the reference point between the PGW 108 and the AAA server 110 for mobility related authentication if needed. This reference point S6b may also be used to retrieve and request storage of mobility parameters. Gx is the interface which provides transfer of (Quality of Service (QoS)) policy and charging rules from the H-PCRF 112h to the Policy and Charging Enforcement Function (PCEF) in the PGW 108. Gxa is the interface which provides transfer of (e.g. QoS) policy information from the V-PCRF 112v to the trusted non-3GPP access network 104. Gxb is the interface between the V-PCRF 112v and the ePDG 125. Gxc is the interface which provides transfer of QoS policy information from the V-PCRF 112v to the SGW 120.

S8 is the roaming interface in case of roaming with home routed traffic. S8 provides the user plane with related control between the gateways in the V-PLMN 100v and the H-PLMN 100h, e.g. the PGW 108 in the H-PLMN 100h and the SGW 120 in the V-PLMN 100v.

S9 is an interface with provides transfer of (e.g. QoS) policy and charging control information between the H-PCRF 112h and the V-PCRF 112v in order to support local breakout function. In all other roaming scenarios, S9 has functionality to provide dynamic QoS control policies from the H-PLMN 100h.

Sgi is the reference point between the PGW 108 and the Operator's IP Services 115.

SWa is an interface which connects the untrusted non-3GPP network 105 with the AAA Proxy 128 and transports access authentication, authorization and charging-related information in a secure manner. SWd is the interface which connects the AAA Proxy 128, possibly via intermediate networks, to the AAA Server 110. SWm is a reference point which is located between the AAA Proxy 128 and the ePDG 125 and is used for AAA signaling (transport of mobility parameters, tunnel authentication and authorization data). Swn is the reference point between the untrusted non-3GPP network 105 and the ePDG 125.

SWx is a reference point is located between the AAA server 110 and the HSS 106 and is used for transport of authentication, subscription and PDN connection related data. STa is a reference point between the AAA server 128 and the trusted non-3GPP network 104. S11 is the reference point between MME/SGSN 118 and the SGW 120. Rx is the reference point between the H-PCRF 112h and the Operator's IP Services 115.

It should be noted that the communication links in the communications system 100 may be of any suitable kind including either a wired or wireless link. The link may use any suitable protocol depending on type and level of layer (e.g. as indicated by the Open Systems Interconnection (OSI) model) as understood by the person skilled in the art.

Some example embodiments of non-3GPP connection setup will now be described with reference to FIGS. 2, 3, 4 and 5. FIG. 2 illustrates the initial attach of trusted non-3GPP access via a Proxy Mobile IPv6 (PMIP, PMIPv6) based interface. FIG. 3 illustrates the initial attach of untrusted non-3GPP access via a GPRS Tunneling Protocol (GTP) based interface. FIG. 4 illustrates the handover procedure from 3GPP to trusted non-3GPP via PMIP based interface. FIG. 5 illustrates the handover procedure from 3GPP to untrusted non-3GPP via GTP based interface.

Note that PMIP or GTP may be used for either trusted or untrusted access connectivity with EPC based on the operators' choice.

Whatever trusted or untrusted access, during the non-3GPP PDN connection set up (initial attach or handover), the non-3GPP access (e.g. the ePDG 125 or a Trusted Wireless Access Gateway (TWAG)) needs to first select an AAA server 110 or an AAA proxy 128 for access authentication and authorization. After successful authentication and authorization, the non-3GPP access (i.e. the ePDG 125) initiates the PDN connection setup request towards PGW 108. Upon receiving the non-3GPP connection request, the PGW 108 needs to select a AAA server 110 or an AAA proxy 128 to initiate authorization request, the PGW 108 then informs the AAA server 110 or AAA proxy 128 of its PGW identity and the Access Point Name (APN) corresponding to the UE's 101 PDN connection and obtains authorization information from the AAA server 110. The AAA server 110 also updates the information registered in the HSS 106, which can be used by MME/SGSN 118 to find the PGW 108 (on which the UE 101 is connected) when the UE 101 handovers back to the 3GPP network 102.

In non-roaming scenarios, both the non-3GPP access (i.e. the ePDG 125) and the PGW 108 directly contact the AAA server 110 in the H-PLMN 100h, no AAA proxy 128 is involved in the PDN connection setup. In roaming scenarios, the non-3GPP access (i.e. the ePDG 125) first sends the authentication and authorization request to a AAA proxy 128 in the V-PLMN 00v which further forwards the request to a AAA server 110 in the H-PLMN 100h. 3GPP has specified that the AAA proxy 128 shall act as a stateful proxy. In the Local Breakout roaming case, PGW 108 also first sends the authorization request to AAA proxy 128 in the V-PLMN 100v which further forwards the request to the AAA server 110 in the H-PLMN 100h. In the home routed roaming case, PGW 108 directly contacts AAA server 110 in the H-PLMN 100h.

Note that the architecture illustrated in FIG. 1 is only an example embodiment with roaming with home routed traffic. The embodiments herein are equally applicable to other architectures such as for example local breakout and non-roaming scenarios. However, only the roaming with home routed traffic architecture is illustrated herein for the sake of simplicity.

As mentioned above, FIG. 2 illustrates an example embodiment of a method for the initial attach of the UE 101 to a trusted non-3GPP access network 104 using a PMIP based interface. In particular, FIG. 2 illustrates an example embodiment of the initial attachment of the UE 101 with a network-based Mobility Management (MM) mechanism over the S2a interface for roaming, Local Break Out (LBO) and non-roaming scenarios. As mentioned above, the S2a interface is the interface between the PGW 108 and the trusted non-3GPP IP Access 104.

The term roaming mentioned above may be described as the ability for a UE 101 to function in a serving network different from the home network. The serving network could be a shared network operated by two or more network operator. Non-roaming is a scenario where the UE 101 is located in its H-PLMN 100h. LBO is a mechanism which permits a UE 101 to be connected to the PGW 108 in the V-PLMN 100v.

The roaming scenario is depicted with a dotted box around the V-PCRF 112v and the AAA proxy 128. For the roaming and the LBO scenario, the vPRCF 112v forwards messages between the non-3GPP access network 103 and the H-PCRF 112h. In the Local Breakout case, the V-PCRF 112v forwards messages between the PGW 108 and the H-PCRF 112h.

In the roaming and LBO cases, the AAA proxy 128 serves as an intermediary node between the trusted non-3GPP IP Access network 104 and the AAA server 110 in the H-PLMN 110h. In the non-roaming case, the V-PCRF 112v is not involved at all.

The example method illustrated in FIG. 2 comprises at least some of the following steps, which steps may be performed in any suitable order than described below. The dotted boxes in FIG. 2 indicate optional steps. The circles in some of the steps in FIG. 2 illustrates that the node associated with the circle splits the step in some embodiments, e.g. in roaming or in local breakout. For example, step 206 goes via the PGW 108 and the H-PCRF 112h in a non-roaming embodiment. In a roaming embodiment with local breakout, the V-PCRF 112v proxies the message in step 206 between the PGW 108 and the H-PCRF 112h.

Step 201

The initial non-3GPP access specific Layer 2 (L2) procedures are performed between the UE 101 and the trusted non-3GPP network 104.

Step 202

The Extensible Authentication Protocol (EAP) authentication and authorization procedure is initiated and performed involving the UE 101, the trusted non-3GPP network 104, the HSS 108 and the AAA server 110. The HSS 106 and the AAA server 110 are illustrated in one box in FIG. 2 due to simplicity. The HSS 106 and the AAA server 110 are separate nodes.

Step 203

After successful authentication and authorization, the non-3GPP access specific Layer 3 (L3) attach procedure is triggered and performed between the UE 101 and the trusted non-3GPP network 104. L3 is the network layer in the OSI model and provides the functional and procedural means of transferring data sequences from a source to a destination host via one or more networks, while maintaining quality of service functions.

Step 204

The trusted non-3GPP network 104 initiates the Gateway Control Session Establishment Procedure with the H-PCRF 112h.

Step 205

The Mobile Access Gateway (MAG) function of trusted non-3GPP network 104 sends a Proxy Binding Update message to the PGW 108. MAG is a gateway which is configured to triggering mobility related signaling on behalf of the attached UE 101.

Step 206

The PGW 108 initiates the IP Connectivity Access Network (IP CAN) Session Establishment Procedure with the H-PCRF 112h.

Step 207

The PGW 108 sends an update PGW address message to the AAA server 110 to inform the AAA server 110 of its PGW identity and the APN corresponding to the UE's. 101 PDN connection.

Step 208

The PGW 108 processes the proxy binding update from step 205 and creates a binding cache entry for the UE 101. The PGW 108 allocates IP address(es) for the UE 101. The PGW 108 then sends a Proxy Binding Acknowledgement message to the MAG function in the trusted non-3GPP network 104, including the IP address(es) allocated for the UE 101.

Step 209

The PMIPv6 tunnel is set up between the trusted non-3GPP network 104 and the PGW 108.

Step 210

The H-PCRF 112h may update the QoS rules in the trusted non-3GPP network 104 by initiating the gateway control and QoS Rules Provision Procedure.

Step 211

The L3 attach procedure is completed via a non-3GPP access specific trigger. IP connectivity between the UE 101 and the PGW 108 is set for uplink and downlink directions.

As mentioned above, FIG. 3 illustrates an example embodiment of a method for the initial attach of the UE 101 to an untrusted non-3GPP access network 105 via a GTP based interface. In more detail, FIG. 3 illustrates an example embodiment of the initial attachment over GTP based S2b for roaming, non-roaming and LBO. As mentioned above, S2b is the interface between the PGW 108 and the ePDG 125. Both a roaming and a non-roaming scenario are depicted in FIG. 3. The roaming scenario is depicted with a dotted box around the V-PCRF 112v and the AAA proxy 128, and is a scenario where the AAA proxy 128 acts as an intermediary node, forwarding messages from the AAA Server 110 in the H-PLMN 100h to the PGW 108 in the V-PLMN 100v and vice versa. Messages between the PGW 108 in the V-PLMN 100v and the H-PCRF 112h in the H-PLMN 100h are forwarded by the V-PCRF 100v in the V-PLMN 100v. In the non-roaming case, the V-PCRF 112v and the AAA Proxy 128 are not involved.

The example method illustrated in FIG. 3 comprises at least some of the following steps, which steps may be performed in any suitable order than described below:

Step 301

An attach procedure for attachment of the UE 101 to the non-3GPP access network 103 is performed.

Step 302

Authentication and authorization of the UE 101 for accessing the non-3GPP access network 103 is performed.

Step 303

The ePDG 125 sends a Create Session Request message to the PGW 108.

Step 304

An attach procedure for attachment of the UE 101.

Step 305

The PGW 108 sends an update of the PGW address to the HSS 106 and the AAA server 110.

Step 306

The PGW 108 sends a Create Session Response message to the ePDG 125.

Step 307

An attach procedure is performed, i.e. the authentication and authorization with the AAA server 110 is successful.

Step 308

IP connectivity from the UE 101 to the PGW 108 is now setup. Any packet in the uplink direction is tunneled to the ePDG 125 by the UE 101 using the IPSec tunnel. The ePDG then tunnels the packet to the PGW using the GTP tunnel. From the PDN GW normal IP-based routing takes place. In the downlink direction, the packet for UE 101 arrives at the PGW 108. The PGW tunnels the packet to the ePDG 125 using the GTP tunnel. The ePDG 125 then tunnels the packet to the UE 101 via the IPsec tunnel.

As mentioned above, FIG. 4 illustrates an example embodiment of a handover procedure from the 3GPP network 102 to the trusted non-3GPP access network 104 via a PMIP based interface. In more detail, FIG. 4 illustrates an example embodiment of handover from the 3GPP network 102 to the trusted non-3GPP IP access network 104 with PMIPv6 on the S2a interface and PMIPv6 or GTP on the S5 interface. As mentioned above, S2a is the interface between the PGW 108 and the trusted non-3GPP access network 104 and S5 is the interface between the SGW 120 and the PGW 108. The interface between the SGW 120 and the PGW 108 may also be referred to as S8. The dotted box around the AAA proxy 128 and the vPRCF 112v indicates the roaming scenario. These two nodes are not involved in the method when it is applied to a non-roaming scenario. The dotted arrows in FIG. 4 indicate optional steps. The circles in some of the steps in FIG. 4 illustrates that the node associated with the circle splits the step in some embodiments, e.g. in roaming or in local breakout. The example method illustrated in FIG. 4 comprises at least some of the following steps, which steps may be performed in any suitable order than described below:

Step 401

The UE 101 is connected in the 3GPP network 102 and has a PMIPv6 or GTP tunnel on the S5 interface.

Step 402

The UE 101 discovers the trusted non-3GPP IP access network 104 and determines to transfer its current sessions (i.e. handover) from the currently used 3GPP network 102 to the discovered trusted non-3GPP IP access network 104.

Step 403

The UE 101 performs access authentication and authorization in the non-3GPP access system 103. The AAA server 110 authenticates and authorizes the UE 101 for access in the trusted non-3GPP access network 104. The AAA server 110 queries the HSS 106 and returns the PGW identity or identities to the trusted non-3GPP access network 104 at this step (upon successful authentication and authorization).

Step 404

After successful authentication and authorization, the L3 attach procedure is triggered between the UE 101 and the trusted non-3GPP access network 104.

Step 405

The trusted non-3GPP IP Access network 104 initiates a Gateway Control Session Establishment Procedure with the PCRF 112.

Step 406

An entity in the trustee non-3GPP IP Access network 104 acting as a MAG sends a Proxy Binding Update message to the PGW 108 in order to establish the new registration.

Step 407

The PGW 108 executes a PCEF-Initiated IP CAN Session Modification Procedure with the PCRF 112.

Step 408

The PGW 108 informs the AAA server 110 of its PGW identity and the APN corresponding to the UE's 101 PDN connection and obtains authorization information from the AAA server 110. The AAA server 110 may update the information registered in the HSS 106.

Step 409

The PGW 108 responds with a PMIP Binding Acknowledgement message to the trusted non-3GPP IP access network 104.

Step 410

The L3 attach procedure is completed at this point. The IP address(es) assigned to the UE 101 by the PGW 108 is conveyed to the UE 101.

Step 411

The PMIPv6 tunnel is set up between the trusted non-3GPP IP access network 104 and the PGW 108. The UE 101 can send/receive IP packets at this point.

Step 412

For connectivity to multiple PDNs, the UE 101 establishes connectivity to all the PDNs that are being transferred from 3GPP network 102 besides the PDN connection that was established in the steps 403-410.

Step 413

The PGW 108 initiates the 3GPP EPS Bearer release procedure.

As mentioned above, FIG. 5 illustrates an example embodiment of the handover procedure from the 3GPP access network 102 to the untrusted non-3GPP access network 105 via a GTP based interface. In more detail, FIG. 5 illustrates an example embodiment of handover of the UE 101 from the 3GPP access network 102 to the untrusted non-3GPP IP access network 105 with GTP on the S2b interface. S2b is the interface between the PGW 108 and the ePDG 125. The dotted arrow in FIG. 5 indicates an optional step. The circles in some of the steps in FIG. 5 illustrates that the node associated with the circle splits the step in some embodiments, e.g. in roaming or in local breakout. The example method illustrated in FIG. 5 comprises at least some of the following steps, which steps may be performed in any suitable order than described below:

Step 501

A radio bearer and a S1/S4 bearer are established between the UE 101 and the SGW 120. A GTP tunnel is established between the SGW 120 and the PGW 108.

Step 502

The UE 101 moves and attaches to an untrusted non-3GPP IP access network 105. An access authentication procedure between the UE 101 and the 3GPP network 102 is performed. The Internet Key Exchange version 2 (IKEv2) tunnel establishment procedure is started by the UE 101.

Step 503

The ePDG 125 sends a Create Session Request message to the PGW 108.

Step 504

A PCEF initiated IP CAN Session Modification Procedure is executed by the PGW 108 with the H-PCRF 112h.

Step 505

The PGW 108 informs the AAA server 110 about its PGW identity and the APN corresponding to the UE's PDN Connection and obtains authorization information from the AAA server 110. The message includes information that identifies the PLMN in which the PDN GW is located. The AAA server 110 may update the information registered in the HSS 106.

Step 506

The PGW 108 responds with a Create Session Response message to the ePDG 125. A GTP tunnel now exists between the ePDG 125 and the PGW 108.

Step 507

The ePDG 125 and the UE 101 continue the IKEv2 exchange and IP address configuration.

Step 508

At the end of the handover procedure, the PDN connectivity service is provided by IPsec connectivity between the UE 101 and the ePDG 125 concatenated with S2b bearer(s) between the ePDG 125 and the PGW 108.

Step 509

For connectivity to multiple PDNs, the UE establishes connectivity to each PDN that is being transferred from 3GPP access. The PGW 108 initiates the PGW Initiated PDN Disconnection procedure in 3GPP access or the PGW Initiated Bearer Deactivation procedure.

Both the ePDG 125 and PGW 108 need to contact the AAA server 110 during initial non-3GPP connection setup over the EPC (i.e. the 3GPP network 102). The ePDG 125 contacts an AAA server 110 for access authentication and authorization. The PGW 108 contacts an AAA server 110 for authorization and for providing the PGW identity. The AAA server 110 selected by PGW 108 may be different from the AAA server 110 that was selected by ePDG 125 during the non-3GPP connection set up for the same UE 101. The 3GPP standard defines a mechanism to solve this conflict.

The following describes the behavior of the AAA server 110 when it receives the authorization request for a UE 101 from the PGW 108 over S6b reference point:

Upon receipt of the Authorization Request message from the PGW 108, the AAA server 110 shall update the PGW information for the APN for the UE 101 on the HSS 106.

The AAA server 110 checks whether the user's profile is available.

If the user's data exist in the AAA server 110, it checks, whether it also has an active access authorization session for the user.

If not, the AAA server 110 rejects the authorization request, including the Result-Code DIAMETER_AUTHORIZATION_REJECTED.

If the AAA server 110 has an existing authorization session,

If the APN requested by the PGW 108 is included in the list of authorized APNs of the user, then the AAA server 110 shall include the Service-Selection AVP in the authorization answer and set the Result-Code to DIAMETER_SUCCESS.

If the APN requested by the PGW 108 is not included in the list of authorized APNs, then the status code DIAMETER_AUTHORIZATION_REJECTED shall be returned to the PGW 108 to indicate an unsuccessful authorization.

If the user's profile does not exist in the AAA server 110, it shall retrieve the Diameter identity of the AAA server 110 currently serving the user from the HSS 106. Depending on the HSS response.

If the HSS 106 indicates that the user is currently being served by a different AAA server 110, the AAA server 110 shall respond to the PGW 108 with the Result-Code set to DIAMETER_REDIRECT_INDICATION and Redirect-Host set to the Diameter identity of the AAA server 110 currently serving the user (as indicated in the 3GPP-AAA-Server-Name Attribute Value Pair (AVP) returned in the SWx authentication response from the HSS 106).

If the HSS 106 returns DIAMETER_ERROR_USER_UNKNOWN, the AAA server 110 returns the same error to the PGW 108.

If the HSS 106 sends the user's profile to the AAA server 110, the authorization is rejected by setting the Result-Code to DIAMETER_AUTHORIZATION_REJECTED. The AAA server 110 deletes the downloaded user profile.

The procedure when the ePDG 125 (untrusted non-3GPP access) and the PGW 108 select different AAA servers 110 during non-3GPP connection setup are shown in FIG. 6. The dotted arrows in FIG. 6 indicate optional steps. Two AAA servers 110 are illustrated in FIG. 6, i.e. AAA server 1 110_1 and AAA server_2 110_2. The reference number 110 is expanded with _1 in order to indicate the AAA server 1 and with _2 in order to indicate the AAA server 2. When only using the reference number 110, it may refer to any of the AAA servers 1 or 2. The procedure illustrated in FIG. 6 comprises at least some of the following steps, which steps may be performed in any suitable order than described below:

Step 601

The UE 101 performs access authentication in the non-3GPP access network 103 with the ePDG 125.

Step 602

The ePDG 125 selects the AAA server 110 during the access authentication, e.g. it selects the AAA server 1 110_1.

Step 603

The AAA server 1 110_1 authenticates and authorizes the UE 101 for access to the non-3GPP access network 103.

Step 604

The AAA server 1 110_1 downloads the user profile for the UE 101 from the PGW 108. When downloading the user profile, the AAA server 1 110_1 queries the HSS 106 and returns the PGW identity or identities to the AAA server 1 110_1 (upon successful authentication and authorization).

Step 605

The ePDG 125 sends a Create Session Request message to the PGW 108.

Step 606

The PGW 108 sends a Credit Control Request-Initial (CCR-I) message or a Credit Control Request-Update (CCR-U) message to the PCRF 112.

Step 607

If the message sent in step 606 was a CCR-I message, the PCRF 112 sends a Credit Control Answer-Initial (CCA-I) message back to the PGW 108. If the message sent in step 606 was a CCR-U message, the PCRF 112 sends a Credit Control Answer-Update (CCA-U) message back to the PGW 108.

Step 608

The PGW 108 selects the AAA server 2 110_2 during authorization.

Step 609

The PGW 108 sends an Authorize Authenticate Request (AAR) message to the AAA server 2 110_2 which was selected in step 608. The AAR message comprises PGW information and APN.

Step 610

The AAA server 2 110_2 detects that no profile exists for the requested UE 101, and determines that it needs to retrieve information from the HSS 106 indicating the AAA server 110 which currently serves the UE 101.

Step 611

The AAA server 2 110_2 sends a Provide User Profile Request message to the HSS 106. The purpose of the Provide User Profile Request message is to retrieve the Diameter Identity of the AAA server currently serving the UE 101.

Step 612

The HSS 106 sends a Provide User Profile Acknowledgement message to the AAA server 2 110_2. The message comprises the information indicating the identity of the AAA server 1 110_1.

Step 613

The AAA server 2 110_2 sends an Authorize Authenticate Answer message to the PGW 108. The message comprises information indicating that the Redirect-Host is set to the AAA server 1 110_1 currently serving the user. The Authorize Authenticate Answer message is a response to the AAR message in step 609.

Step 614

When the PGW 108 receives the response with Redirect-Host to a different AAA server 110 compared to the one which the PGW 108 selected in step 608, then PGW 108 will re-initiate authorization request to AAA server 1 110_1. The PGW 108 therefore sends an AAR message to the AAA server 1 110_1. The AAR message comprises PGW information and information indicating the APN associated with the UE 101.

Step 615

The AAA server 1 110_1 sends an Update PGW Id Request message to the HSS 106.

Step 616

The HSS 106 sends an Update PGW Id Acknowledgement message to the AAA server 1 110_1 in response to the request message in step 615.

Step 617

The AAA server 1 110_1 sends an AAA message to the PGW 108 indicating that the authorization to authenticate the UE 101 has been successful. The AAA message is a response to the AAR message in step 614.

Step 618

The PGW 108 sends a Create Session Response message to the ePDG 125. The Create Session Response message is a response to the Create Session Request message in step 605.

Such a procedure illustrated in FIG. 6 from step 609 to 617 has a high time delay for the handover from 3GPP to non-3GPP or the initial non-3GPP connection set up. The impact on the time delay of handover procedure is even worse than initial connection setup. It also puts additional load on the HSS 106 which is an entity that is sensitive to load and where a lot of effort is usually done to reduce unnecessary load

SUMMARY

An objective of embodiments herein is therefore to obviate at least one of the above disadvantages and to provide optimized access for a UE to an EPC service via a non-3GPP access network.

According to a first aspect, the object is achieved by a method performed by a PGW for handling a UEs access to an EPC service via a non-3GPP access network. During a request for connecting the UE to the non-3GPP access network, the PGW receives identity information which indicates an identity of an AAA node from a non-3GPP access gateway. The PGW selects the AAA node which was indicated in the received identity information. The PGW transmits, to the selected AAA node, a request message for the UE. The request message is a request for authorization of the UE to access the EPC service via the non-3GPP access network.

According to a second aspect, the object is achieved by a method performed by a non-3GPP access gateway for handling a UEs access to an EPC service via a non-3GPP access network. During a request for connecting the UE to the non-3GPP access network, the non-3GPP access gateway transmits, to a PGW, identity information which indicates an identity of an AAA node.

According to a third aspect, the object is achieved by a PGW for handling a UEs access to an EPC service via a non-3GPP access network. The PGW is adapted to, during a request for connecting the UE to the non-3GPP access network, receive identity information which indicates an identity of an AAA node from a non-3GPP access gateway. The PGW is adapted to select the AAA node which was indicated in the received identity information. The PGW is adapted to transmit, to the selected AAA node, a request message for the UE. The request message is a request for authorization of the UE to access the EPC service via the non-3GPP access network.

According to a fourth aspect, the object is achieved by a non-3GPP access gateway for handling a UEs access to an EPC service via a non-3GPP access network. The non-3GPP access gateway is adapted to, during a request for connecting the UE to the non-3GPP access network, transmit to a PGW, identity information which indicates an identity of an AAA node.

Since the non-3GPP access gateway provides the identity information which indicates the identity of the AAA node to the PGW during the request for connection of the UE to the non-3GPP access network, the PGW can use the AAA node indicated in the identity information for subsequent authorization of the UE to access the EPC service via the non-3GPP access network.

Embodiments herein afford many advantages, of which a non-exhaustive list of examples follows:

An advantage of the embodiments herein is that they may reduce the time delay for non-3GPP connection setup. Another advantage of the embodiments herein is that they may reduce the network traffic (e.g. the Diameter signaling) load. A further advantage of the embodiments herein is that they may reduce load on network entities such as e.g. the HSS.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

With the embodiments herein, the non-3GPP access gateway provides the PGW with the identity of the AAA node currently serving the UE when requesting access to the EPC service via the non-3GPP access network (for both initial attach and handover). Then the PGW uses the indicated AAA node for the subsequent authorization of the UE to access the EPC service via the non-3GPP access network. This may also be described as the UE access the EPC or the EPC service via the non-3GPP access network. There may be one or more EPC services which the UE can access.

Figure 1:
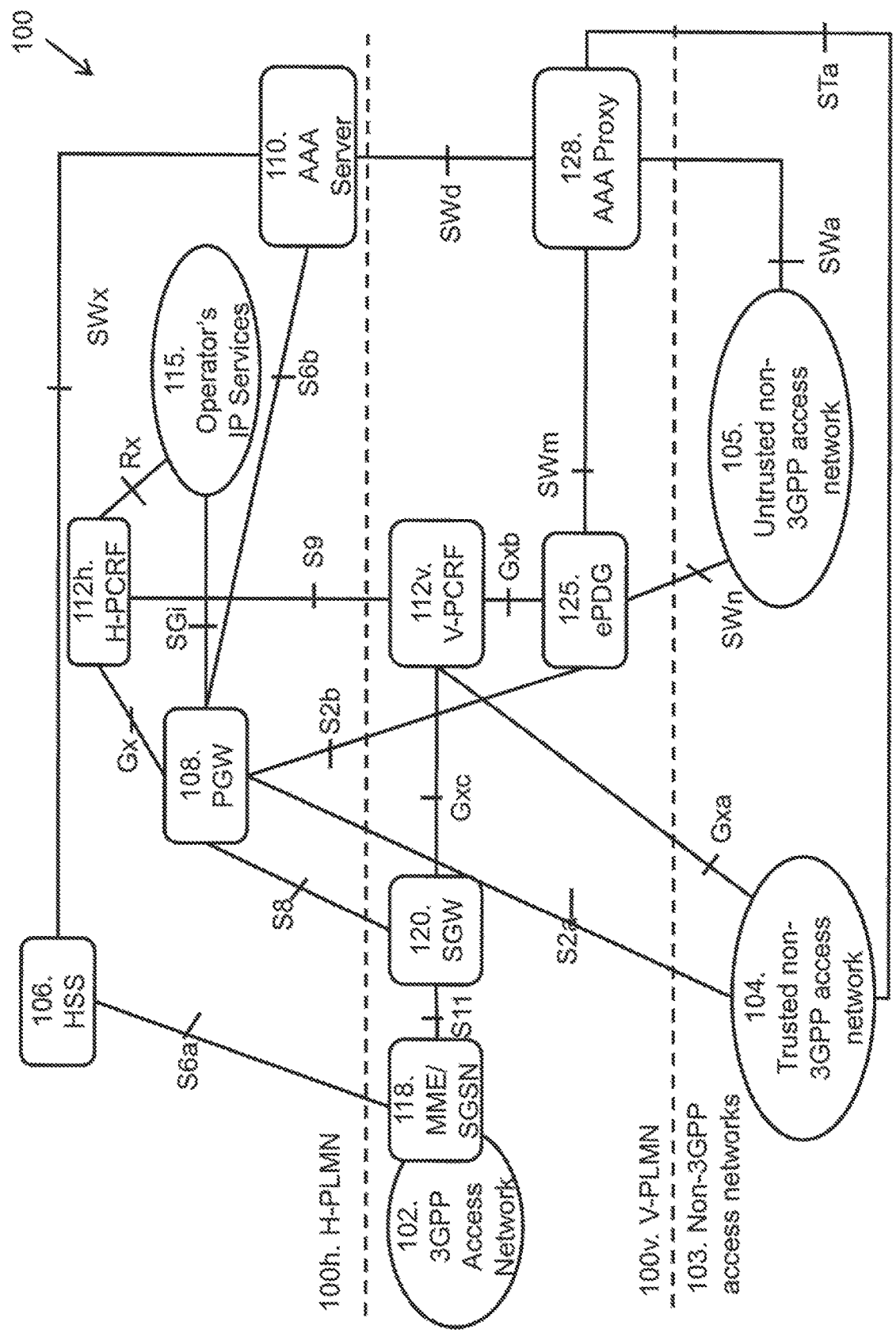
FIG. 1 is a schematic block diagram illustrating an example embodiment of a communications system.
Figure 2:
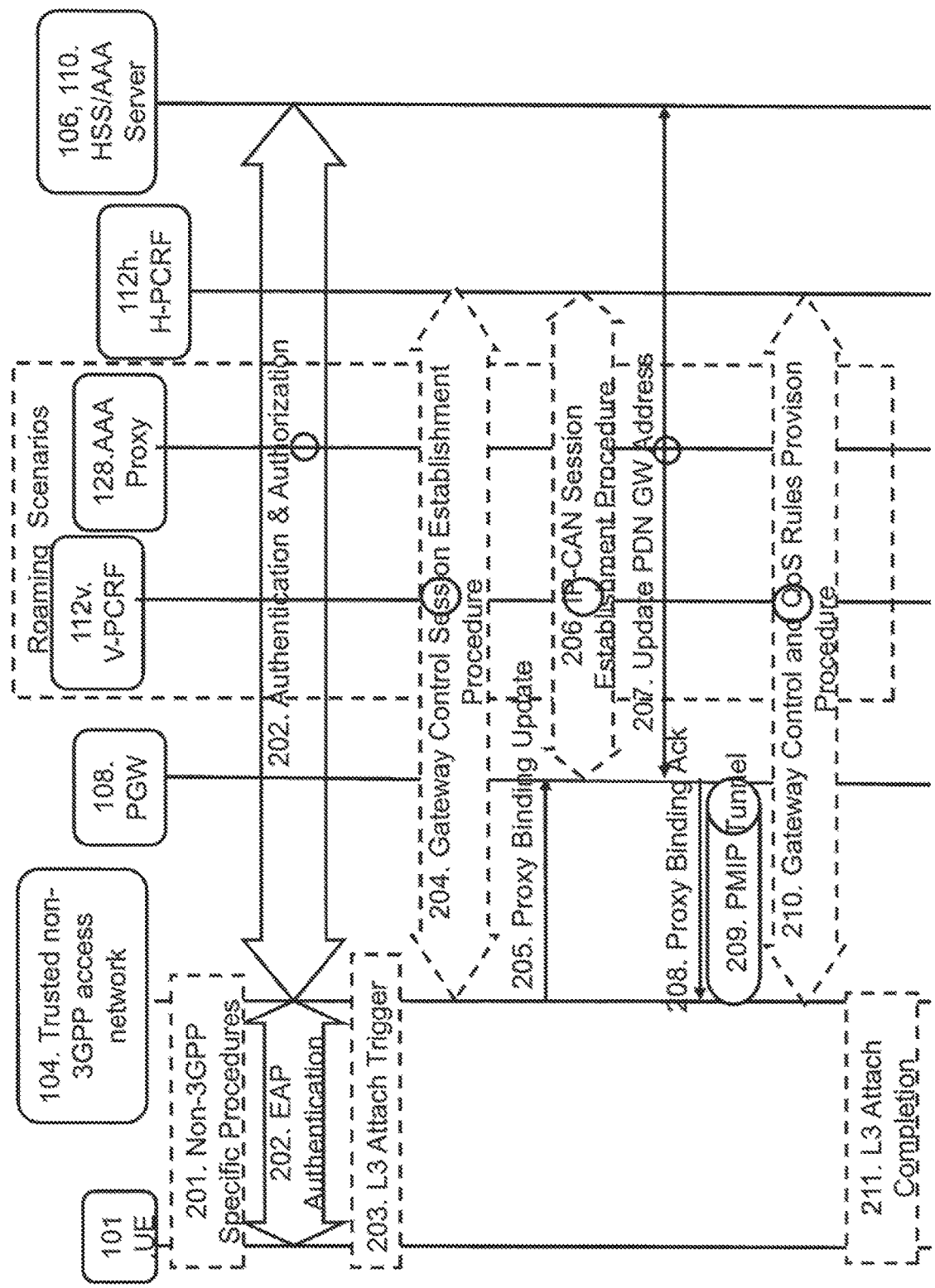
FIG. 2 is a signaling diagram illustrating an example embodiment of an initial attach of a UE to a trusted non-3GPP access network via a PMIP based interface.
Figure 3:
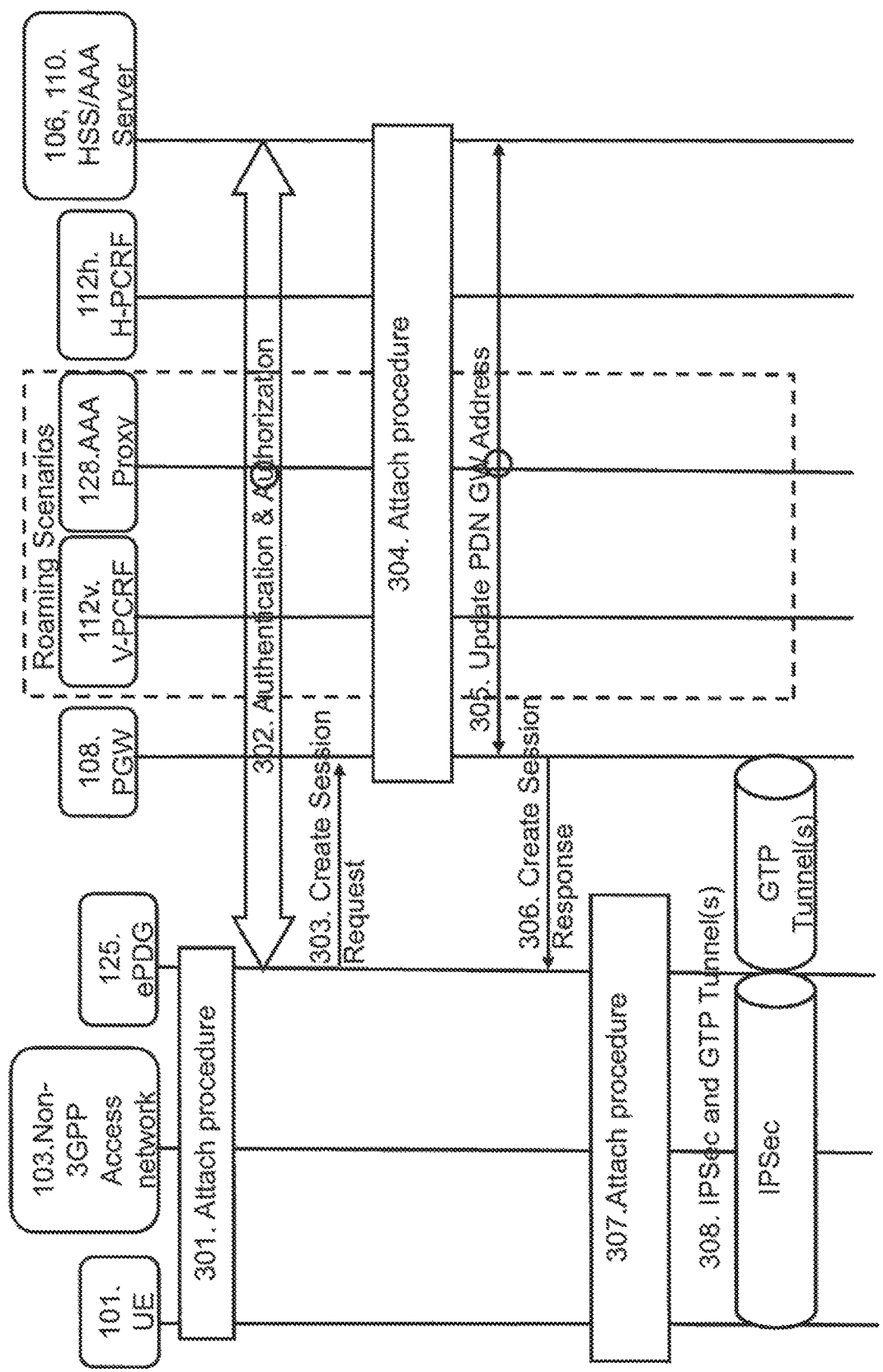
FIG. 3 is a signaling diagram illustrating an example embodiment of an initial attach of the UE to an untrusted non-3GPP access network via a GTP based interface.
Figure 4:
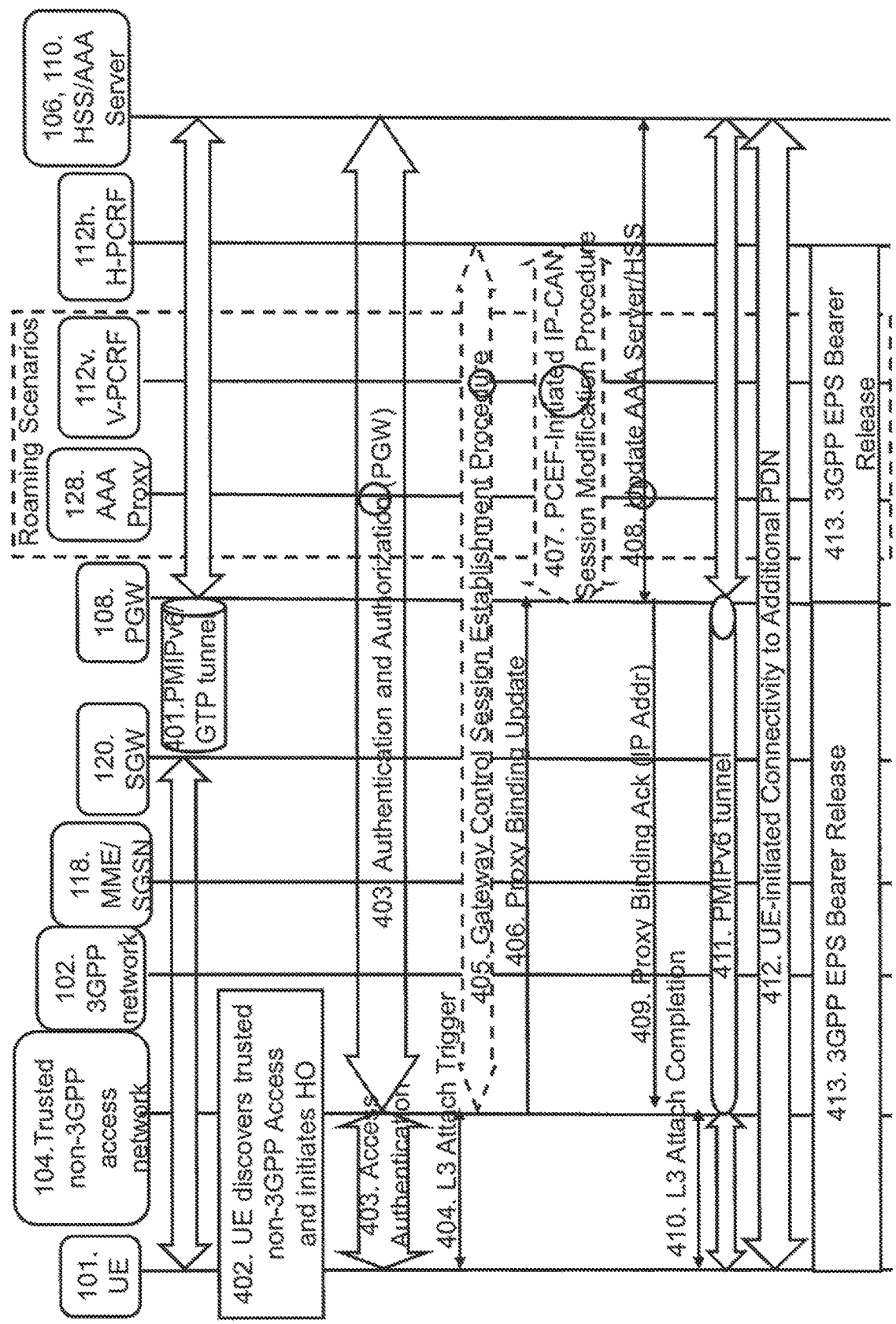
FIG. 4 is a signaling diagram illustrating an example embodiment of a handover of the UE from the 3GPP network to the trusted non-3GPP access network via a PMIP based interface.
Figure 5:
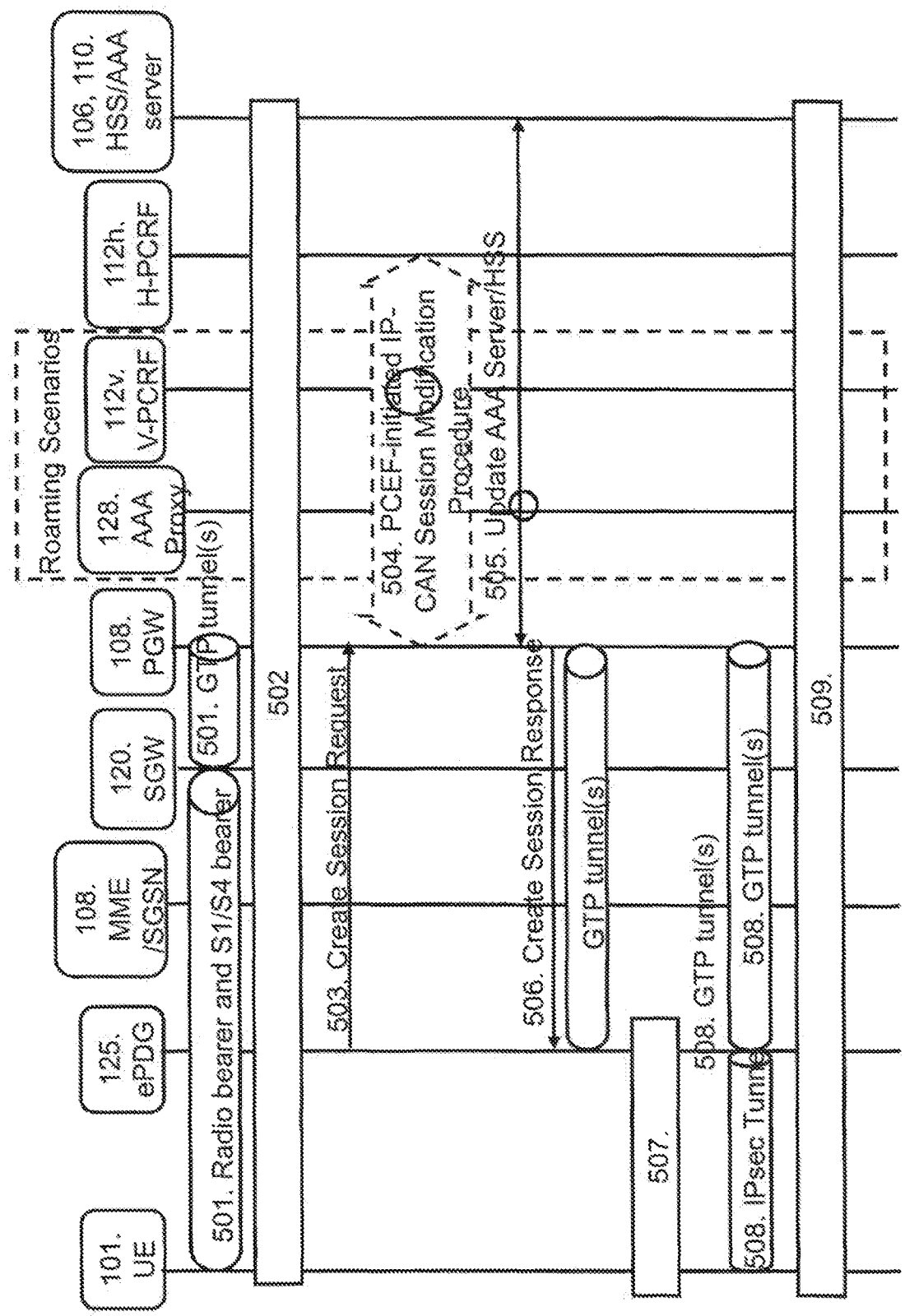
FIG. 5 is a signaling diagram illustrating an example embodiment of a handover of the UE from the 3GPP network to the untrusted non-3GPP access network via a GTP based interface.
Figure 6:
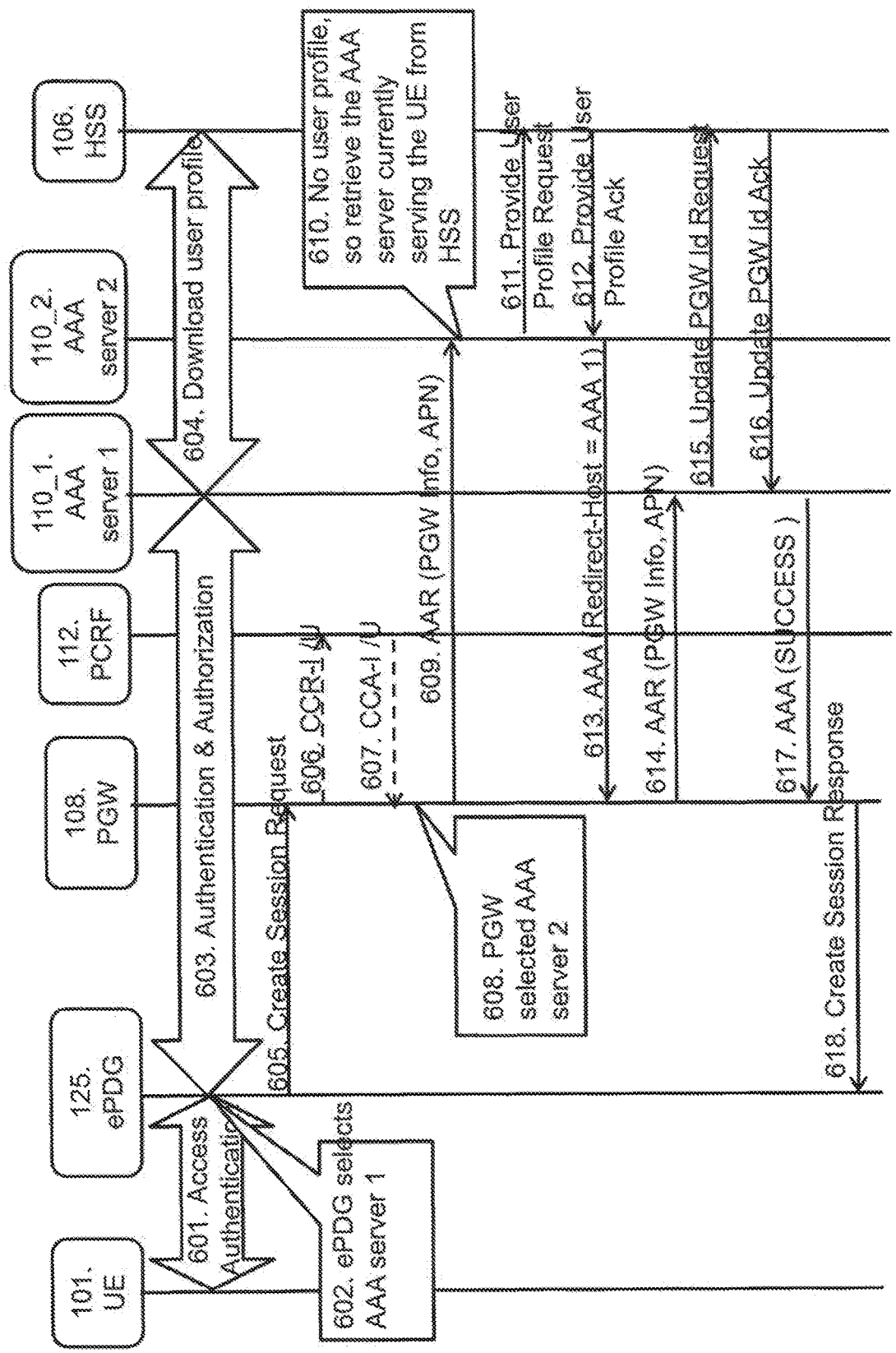
FIG. 6 is a signaling diagram illustrating an example embodiment of when different AAA servers are selected during a non-3GPP connection setup.
Figure 7:
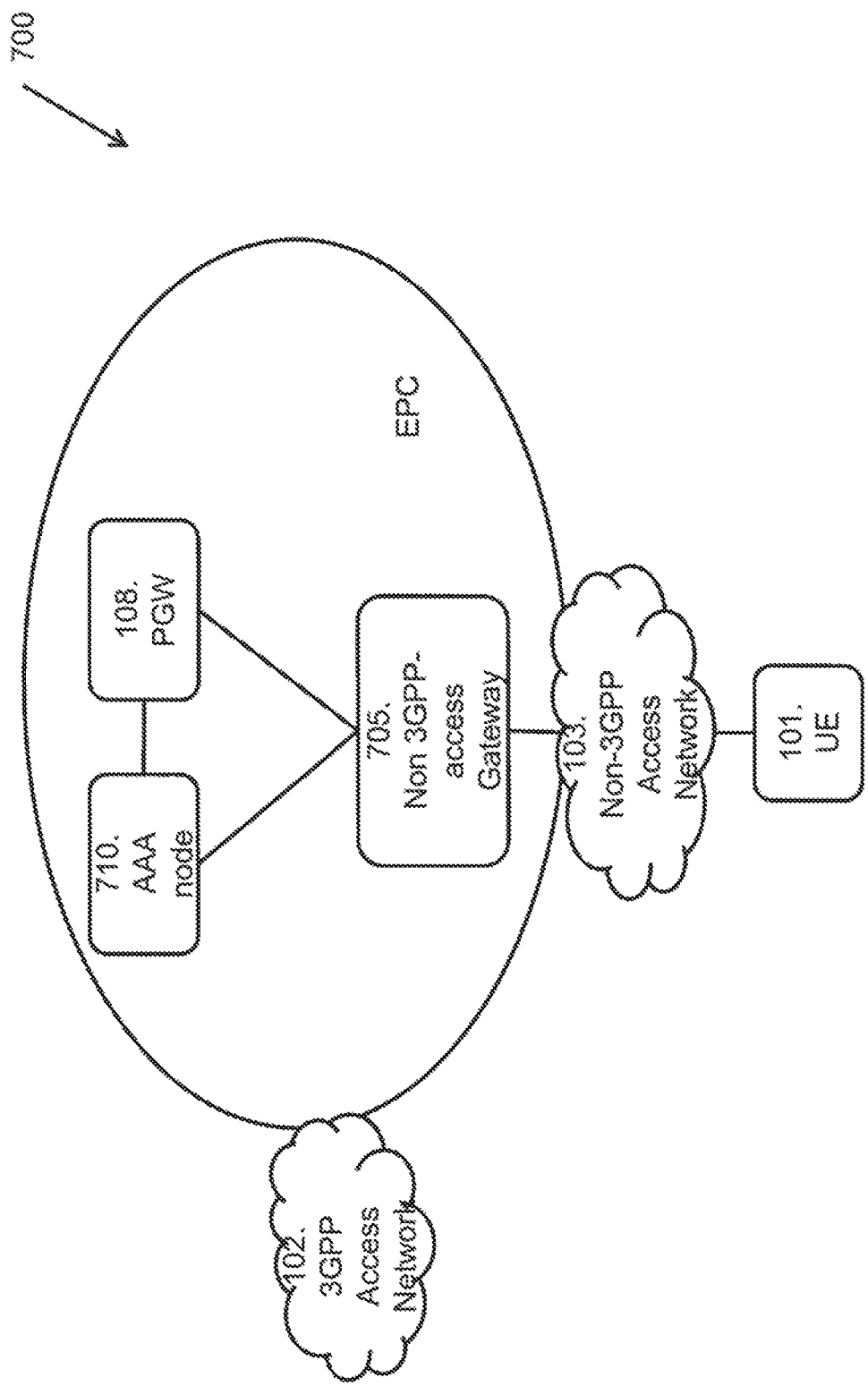
FIG. 7 is a schematic block diagram illustrating an example embodiment of a communications system.

FIG. 7 depicts a communications system 700 in which embodiments herein may be implemented. The communications system 700 may also be referred to as e.g. a wireless communications network, a wireless communications system, a communications network, a network or a system. The communications system 100 illustrated in FIG. 1 is a detailed example embodiment of the communications system 700 in FIG. 7. The communications system 700 in FIG. 7 may comprise additional nodes than the ones illustrated in FIG. 7, such as the ones illustrated in FIG. 1 or in any other suitable type of communications system.

The communications system 700 comprises a UE 101 connected to a non-3GPP access gateway 705. The non-3GPP access gateway 705 may be for example an ePDG 125 as illustrated in FIG. 1 or a TWAG or a MAG (not illustrated). An ePDG 125 is configured to secure the data transmission with a UE 101 connected to the EPC over an untrusted non-3GPP access network 103. For this purpose, the ePDG 125 may acts as a termination node of IPsec tunnels established with the UE 101. A TWAG is a gateway which is configured to enable integration of WiFi access and LTE core networks, i.e. integration of a non-3GPP access network 103 and a 3GPP network 102.

The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

The non-3GPP access gateway 705 is configured to be connected to a PGW 108 and an AAA node 710. The PGW 108 and the AAA node 710 may be connected together. The AAA node 710 may also be referred to as an AAA entity, an AAA function etc. The AAA node 710 may be for example an AAA server 110, an AAA proxy 128 as illustrated in FIG. 1. In some embodiments, the AAA node 710 may be a combined AAA server and AAA proxy node.

The non-3GPP access gateway 705 is a gateway to the non-3GPP network 103. The UE 101 may be provided access to EPC services via the non-3GPP network 103.

As mentioned earlier, the examples of a 3GPP access network 102 may be GPRS, UMTS, EDGE, HSPA, LTE and LTE Advanced, and examples of a non-3GPP access network 103 may be CDMA 2000, Wi-Fi, Wimax or a fixed network.

It should be noted that the communication links in the communications system 700 may be of any suitable kind including either a wired or wireless link. The link may use any suitable protocol depending on type and level of layer (e.g. as indicated by the OSI model) as understood by the person skilled in the art.

Figure 8:
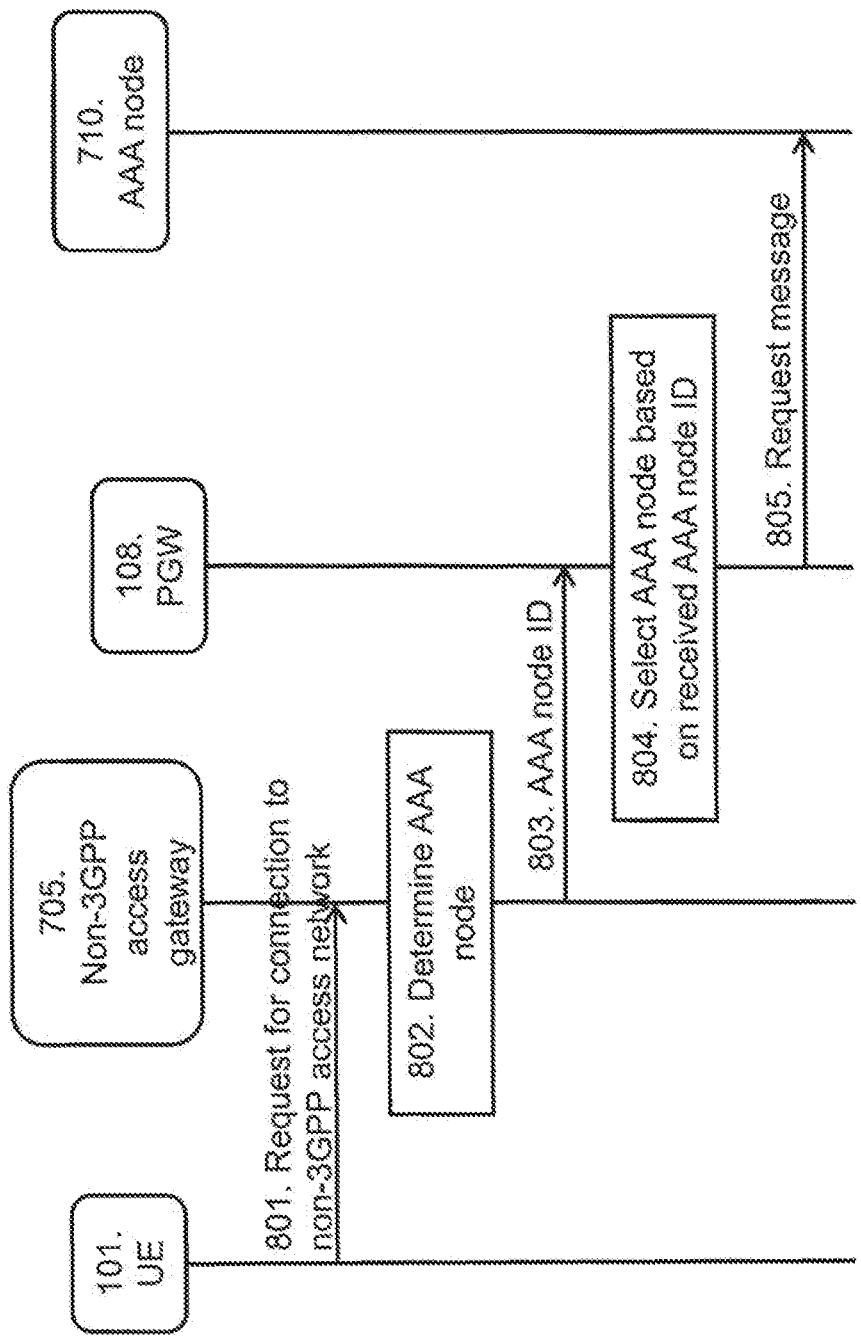
FIG. 8 is a signaling diagram illustrating an example embodiment of a method for handling a UEs access to the EPC service via a non-3GPP access network.

FIG. 8 is a signaling diagram illustrating embodiments of a method for handling the UEs 101 access to EPC services via a non-3GPP access network 103. The method in FIG. 8 comprises at least some of the following steps, which steps may be performed in any suitable order than described below:

Step 801

The UE 101 sends a request message to the non-3GPP access gateway 705 to request connection to the non-3GPP access network 103 and to access of EPC services via the non-3GPP access network 103.

Step 802

The non-3GPP access gateway 705 determines an AAA node 710. The AAA node 710 may be determined by a selection performed by the non-3GPP access gateway 705 or by that the non-3GPP access gateway 705 receives information about the AAA node 710 from e.g. an AAA server 110.

Step 803

The non-3GPP access gateway 705 sends identity information which indicates the identity of the AAA node 710 from step 802 to the PGW 108.

Step 804

Based on the received identity information from step 803, the PGW 108 selects the AAA node 710.

Step 805

The PGW 108 sends a request message to the AAA node 710 which was selected in step 804.

The non-3GPP access gateway 705 can connect to the non-3GPP access network 103 via the non-3GPP access network 103 by using the GTPv2 or the PMIPv6 protocol interface.

When the GTPv2 protocol is used, the Create Session Request message is extended to comprise the identity of the AAA node 710 which is used by non-3GPP access gateway 705 for authentication and authorization of the UE 101 to access the EPC service via the non-3GPP access network 103.

When the PMIP protocol is used, the PBU message is extended to include the identity of the AAA node 710 which is used by the non-3GPP access gateway 705 for authentication and authorization of the UE 101 to access the EPC service via the non-3GPP access network 103.

The PGW 108 uses the identity of the AAA node received from non-3GPP access gateway 705 to initiate an authorization request.

The identity of the AAA node may be mandatory for an initial connectivity request for non-3GPP access when no previous PDN connections have been created by the UE 101 using the non-3GPP access gateway 705 (e.g. an attach or a handover), but may be optional for the additional connectivity request (e.g. multiple PDN connections).

Figure 9:
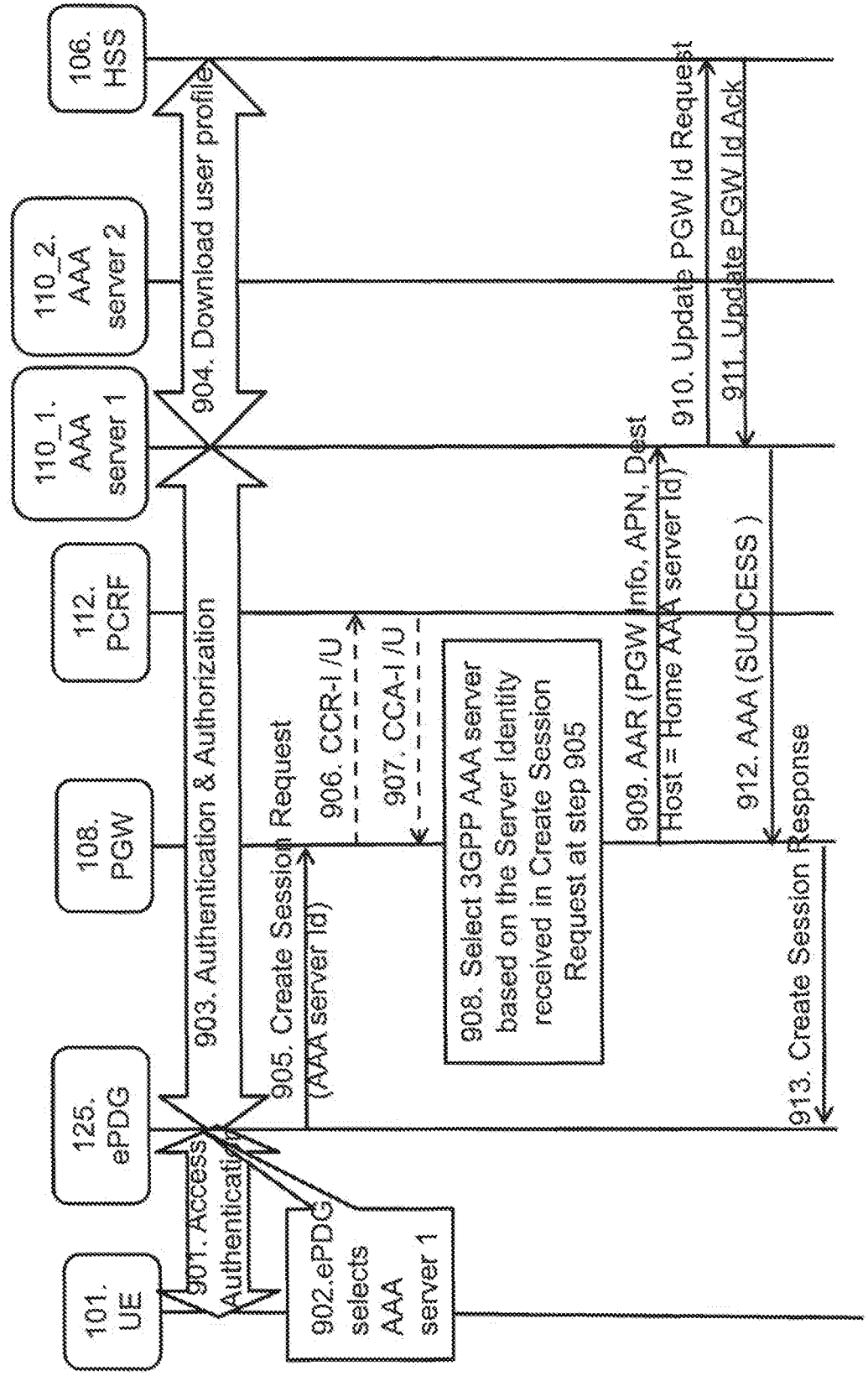
FIG. 9 is a signaling diagram illustrating an example embodiment of an untrusted non-3GPP initial connection setup with a GTP-based interface (non-roaming).
Figure 10:
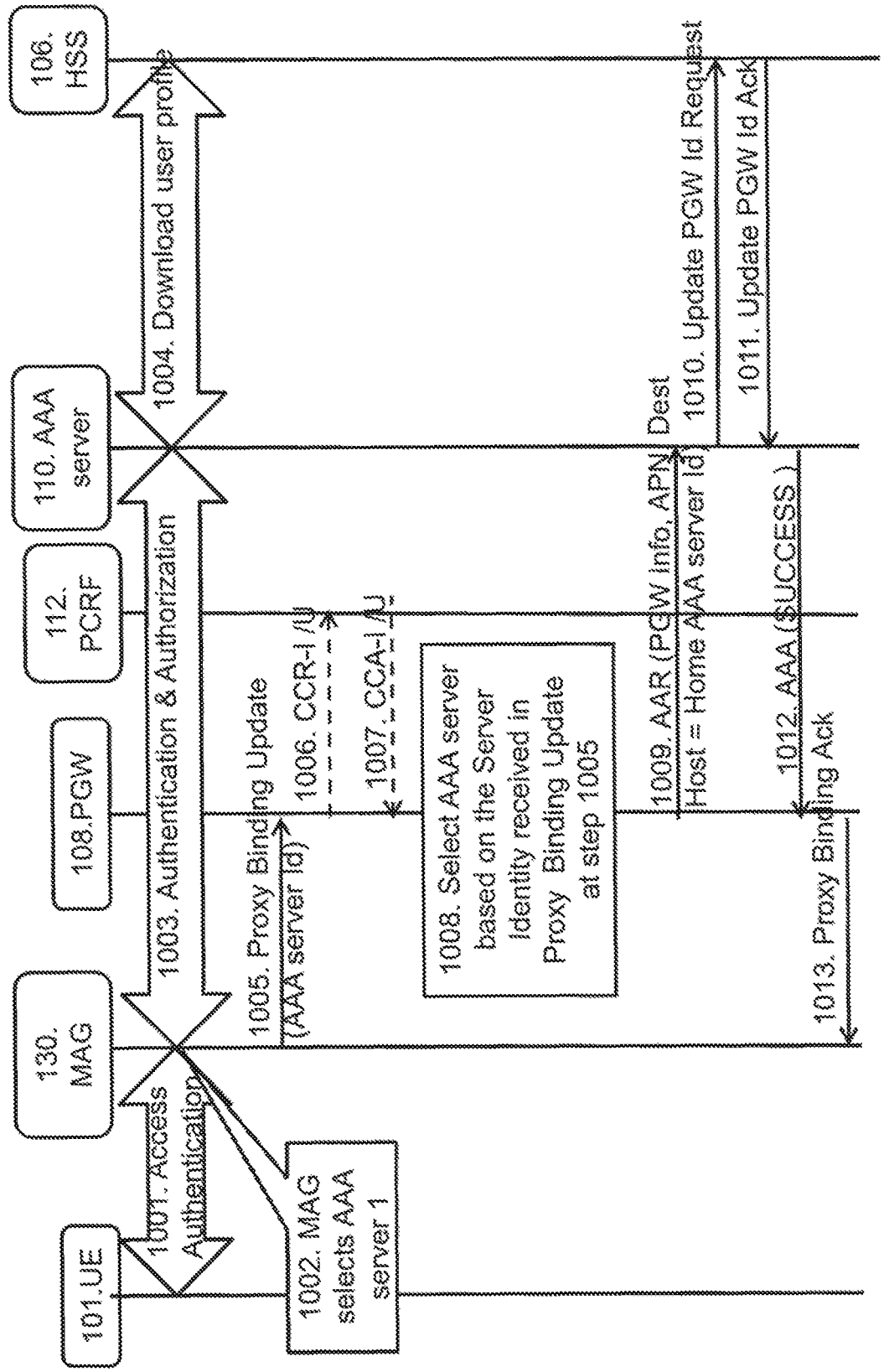
FIG. 10 is a signaling diagram illustrating an example embodiment of a trusted non-3GPP initial connection setup with a PMIP-based interface (non-roaming).

Some more detailed example embodiments of the method illustrated in FIG. 8 will now be described with reference to FIGS. 9, 10 and 11. The embodiments herein are applicable to both an untrusted non-3GPP access connection procedure (an example embodiment using GTPv2 is shown in FIG. 9) and a trusted non-3GPP access procedure (an example embodiment using PMIP is shown in FIG. 10). Both FIGS. 9 and 10 are applicable to the non-roaming case and the roaming case is exemplified in FIG. 11.

FIG. 9 illustrates an example embodiment of procedure for an untrusted non-3GPP initial connection setup with a GTP-based interface (non-roaming). In FIG. 9, the AAA node 710 is represented by an AAA server 110 and the non-3GPP access gateway 705 is represented by an ePDG 125. The method illustrated in FIG. 9 comprises at least some of the following steps, which steps may be performed in any suitable order than described below:

Step 901

This step corresponds to step 801 in FIG. 8. The UE 101 performs access authentication in the non-3GPP access network 103 with the ePDG 125.

Step 902

This step corresponds to step 802 in FIG. 8. The ePDG 125 selects the AAA server 110 during the access authentication, e.g. it selects the AAA server 1 110_1. The authentication is for the UE 101 to access the EPC service via the non-3GPP access network 103. In some embodiments, information indicating the AAA server 1 110_1 may be received from e.g. the AAA server 110.

Step 903

The AAA server 1 110_1 authenticates and authorizes the UE 101 for access to the non-3GPP access network 103.

Step 904

The AAA server 1 110_1 downloads the user profile for the UE 101 from the PGW 108. When downloading the user profile, the AAA server 1 110_1 queries the HSS 106 and returns the PGW identity or identities to the AAA server 1 110_1 (upon successful authentication and authorization).

Step 905

This step corresponds to step 803 in FIG. 8. The ePDG 126 sends a Create Session Request message comprising identity information indicating the identity of the AAA server 1 110_1. The identity information may be for example the Diameter Identity of the AAA server 110 (i.e., AAA Server 1 110_1) selected at step 902. This is applicable to a connection request from the UE 101 for both initial attach over the non-3GPP access network 103 and a handover of the UE 101 from the 3GPP network 102 to the non-3GPP access network 103.

Step 906

PGW 108 receives the Create Session Request message, and initiates IP-CAN session establishment (if initial attach) or modification (if handover) with the PCRF 112 if a PCC procedure is configured. The PGW 108 sends a CCR-I message (if initial attach) or a CCR-U message (if handover) to the PCRF 112.

Step 907

If the message sent in step 906 was a CCR-I message, the PCRF 112 sends a CCA-I message back to the PGW 108. If the message sent in step 906 was a CCR-U message, the PCRF 112 sends a CCA-U message back to the PGW 108.

Step 908

This step corresponds to step 804 in FIG. 8. The PGW 108 detects the Create Session Request message comprising the identity of the AAA server 110 selected by ePDG. Then, the PGW 108 uses that AAA server 110 as a destination for the S6b interface. This may also be described as the PGW 108 uses the identity for any operation between the PGW 108 and the AAA server 110 that serves the UE 101 (e.g. the S6b procedures).

Step 909

This step corresponds to step 805 in FIG. 8. The PGW 108 triggers authorization procedure (e.g. S6b update) towards the AAA server 110 provided by non-3GPP access by sending an AAR message to the AAA server 110 which was selected in step 908. The PGW 108 may send the AAR message (e.g. an S6b request) via a Diameter Routing Agent (DRA) node if the selected AAA server 110 is not the direct configured Diameter peer. The PGW 108 sets the received identity of the selected AAA server 110 as the Destination Host of the AAR message so that the intermediate DBA node can route the request to the proper AAA server 110.

Step 910

The AAA server 1 110_1 sends an Update PGW Id Request message to the HSS 106.

Step 911

The HSS 108 sends an Update PGW Id Acknowledgement message to the AAA server 1 110_1.

Step 912

The AAA server 1 110_1 sends an AAA message to the PGW 108 indicating that the authorization of the UE 101 to access the EPC services via the non-3GPP access network 103 has been successful.

Step 913

The PGW 108 accepts the session creation request upon successful authorization by sending a Create Session Response message to the ePDG 125. The Create Session Response message is a response to the Create Session Request message in step 905.

FIG. 10 is a signalling diagram illustrating example embodiments of a procedure for trusted non-3GPP Initial connection setup with a PMIP-based interface (non-roaming). In FIG. 10, the AAA node 710 is represented by an AAA server 110 and the non-3GPP access gateway is represented by a MAG 130. MAG 130 may be described as function that is used when the PMIP protocol is used instead of GTP. The MAG function may be located in a TWAG (when PMIP is used on S2a for trusted access) and in the ePDG 125 (when PMIP is used on S2b for untrusted access). When GTP is used on S2a and S2b, there is no MAG function in the TWAG or the ePDG 125. The connection setup procedure for PMIP based trusted non-3GPP access is shown in FIG. 10. The logic is similar as that of GTP based non-3GPP access (e.g. FIG. 9), except that the interface messages are changed into PMIP PBU and PBA. The method exemplified in FIG. 10 comprises at least some of the following steps, which steps may be performed in any suitable order than described below:

Step 1001

This step corresponds to step 801 in FIG. 8 and step 901 in FIG. 9. The UE 101 performs access authentication in the non-3GPP access network 103 with the MAG 130.

Step 1002

This step corresponds to step 802 in FIG. 8 and step 902 in FIG. 9. The MAG 130 selects the AAA server 110 during the access authentication, e.g. it selects the AAA server 1.

Step 1003

The AAA server 110 authenticates and authorizes the UE 101 for access to the non-3GPP access network 103.

Step 1004

The AAA server 110 downloads the user profile for the UE 101 from the PGW 108. When downloading the user profile, the AAA server 110 queries the HSS 106 and returns the PGW identity or identities to the AAA server 110 (upon successful authentication and authorization).

Step 1005

The MAG 130 sends a Proxy Binding Update message comprising identity information indicating the identity of the AAA server 110. The identity information may be for example the Diameter Identity of the AAA server (e.g. AAA Server 1) selected at step 1002. This is applicable to a connection request from the UE 101 for both initial attach over the non-3GPP access network 103 and a handover of the UE 101 from the 3GPP network 102 to the non-3GPP access network 103.

Step 1006

PGW 108 receives the Create Session Request message, and initiates IP-CAN session establishment (if initial attach) or modification (if handover) with the PCRF 112 if a PCC procedure is configured. The PGW 108 sends a CCR-I message (if initial attach) or a CCR-U message (if handover) to the PCRF 112.

Step 1007

If the message sent in step 1006 was a CCR-I message, the PCRF 112 sends a CCA-I message back to the PGW 108. If the message sent in step 1006 was a CCR-U message, the PCRF 112 sends a CCA-U message back to the PGW 108.

Step 1008

This step corresponds to step 804 in FIG. 8 and step 903 in FIG. 9. The PGW 108 detects the Create Session Request message comprising the Identity of the AAA server 110 selected by MAG 130. Then, the PGW 108 uses that AAA server 110 for authorization of the UE 101 to access the EPC service via the non-3GPP access network 103.

Step 1009

This step corresponds to step 805 in FIG. 8 and step 909 in FIG. 9. The PGW 108 triggers authorization procedure towards the AAA server 110 provided by non-3GPP access by sending an AAR message to the AAA server 110 which was selected in step 1008. The PGW 108 may send the AAR message via a DRA node if the selected AAA server 110 is not the direct configured Diameter peer. The PGW 108 sets the received identity of the home AAA server 110 as the Destination Host of the AAR message so that the intermediate DRA node can route the request to the proper AAA server 110.

Step 1010

The AAA server 1 110 sends an Update PGW Id Request message to the HSS 106.

Step 1011

The HSS 106 sends an Update PGW Id Acknowledgement message to the AAA server 1 110.

Step 1012

The AAA server 1 110 sends an AAA message to the PGW 108 indicating that the authorization of the UE 101 to access the EPC service via the non-3GPP access network 103 has been successful.

Step 1013

The PGW 108 accepts the session creation request upon successful authorization by sending a Create Session Response message to the MAG 130. The Create Session Response message is a response to the Create Session Request message in step 1005.

Figure 11:
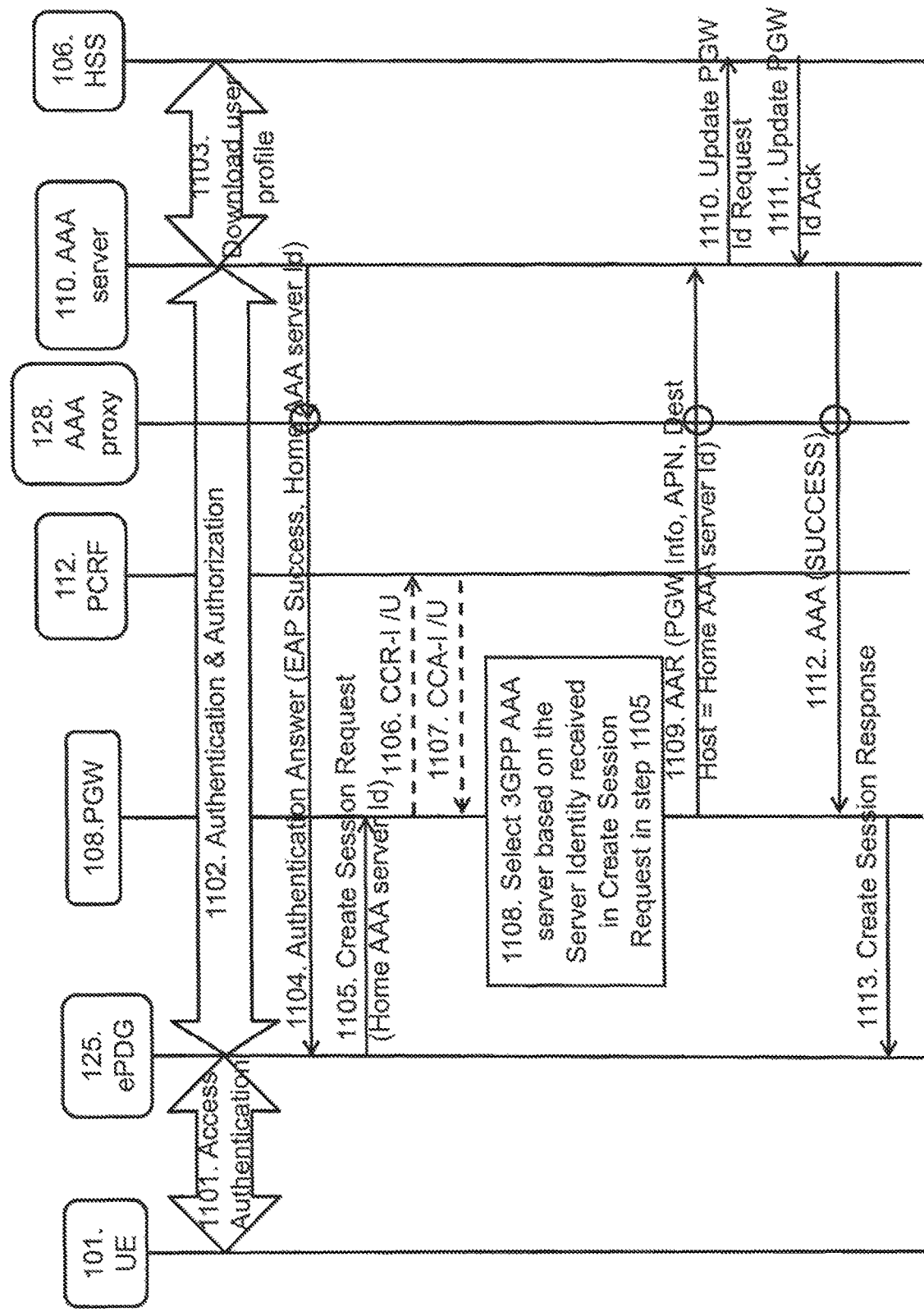
FIG. 11 is a signaling diagram illustrating an example embodiment of a non-3GPP initial connection setup with a GTP-based interface (roaming case).

FIGS. 9 and 10 describe non-roaming scenarios. However, the embodiments herein are also applicable to roaming cases by further enhancing the AAA interface. In the roaming case (including both Local Breakout and home routed cases), the AAA proxy 128 shall include the identity (e.g. the Diameter identity) of the AAA server 110 in the H-PLMN 100h in the authentication answer to the non-3GPP access gateway 710. Then the non-3GPP access gateway 110 includes the identity (e.g. the Diameter Identity) of the home AAA server in the Connection Request message sent to the PGW 108. The PGW 108 uses the received Identity as the AAA server 110 for authorization of the UE 101 to access the EPC service via the non-3PP access network 103. The Impact on GTP or PMIP-based interface is the same as in the non-roaming case. The roaming case with GTP-based non-3GPP access is illustrated in FIG. 11 as follow:

FIG. 11 is a signalling diagram illustrating example embodiments of a procedure for non-3GPP initial connection setup with GTP-based interface (roaming case). In FIG. 11, the AAA node 710 is represented by an AAA server 110 and the non-3GPP access gateway is represented by an ePDG 125. The method exemplified in FIG. 11 comprises at least some of the following steps, which steps may be performed in any suitable order than described below:

Step 1101-1103

These steps corresponds to step 801 in FIG. 8, step 901 in FIG. 9 and step 1001 in FIG. 10. The ePDG 125 detects that the UE 101 is roaming in the V-PLMN 100v and triggers the authentication and authorization procedure to the AAA proxy 128 in the V-PLMN 100v.

Step 1104

This step corresponds to step 802 in FIG. 8, step 902 in FIG. 9 and step 1002 in FIG. 10. The AAA proxy 128 includes identity (e.g. the Diameter Identity) of the home AAA server 110 in the H-PLMN 100h in the final successful Authentication Answer message (EAP Success).

Step 1105

This step corresponds to step 803 in FIG. 8, step 905 in FIG. 9 and step 1005 in FIG. 10. The ePDG 125 sends a Create Session Request message to the PGW 108 including the Identity of the home AAA server 110 received in the final authentication answer in step 1104.

Step 1106-1107

The PGW 108 receives the Create Session Request message, and initiates an IP-CAN session establishment (if initial attach) or modification (if handover) with the PCRF 112 if the PCC procedure is configured. The PGW 108 sends a CCR-I message (if initial attach) or a CCR-U message (if handover) to the PCRF 112 in step 1106.

If the message sent in step 1106 was a CCR-I message, the PCRF 112 sends a CCA-I message back to the PGW 108 in step 1107, if the message sent in step 1106 was a CCR-U message, the PCRF 112 sends a CCA-U message back to the PGW 108 in step 1107.

Step 1108

This step corresponds to step 804 in FIG. 8, step 908 in FIG. 9 and step 1008 in FIG. 10. The PGW 108 uses the received AAA server for authorization of the UE 101 to access the EPC service(s) via the non-3GPP access network 103. In Local Breakout case, the PGW 108 in the V-PLMN 100v first sends the authorization request to the AAA proxy 128 in the V-PLMN 100v. The AAA proxy 128 can select the proper AAA server 110 based on the Destination Host of the authorization request message, which is set to the Identity of the home AAA server 110 by the PGW 108. In home routed case, the PGW 108 in the H-PLMN 100h directly sends the authorization request to the home AAA server 110 received in the Connection Request message.

Step 1109

This step corresponds to step 805 in FIG. 8, step 909 in FIG. 9 and step 1009 in FIG. 10, The PGW 108 triggers authorization procedure towards the AAA server 110 provided by non-3GPP access. The PGW 108 sends an AAR message to the AAA server 110. The AAR message comprises PGW information, APN and an indication of that the destination host for the AAR message is the Home AAA Server.

Step 1110

The AAA server 110 sends an Update PGW Id Request message to the HSS 106.

Step 1111

The HSS 106 sends an Update PGW Id Acknowledgement message to the AAA server 110.

Step 1112

The AAA server 110 sends an AAA message to the PGW 108 to indicate that the authorization of the UE 101 to access the EPC service via the non-3GPP access network 103 was successful.

Step 1113

The PGW 108 accepts the session creation request upon successful authorization and sends a Create Session Response message to the ePDG 125.

Figure 12B:
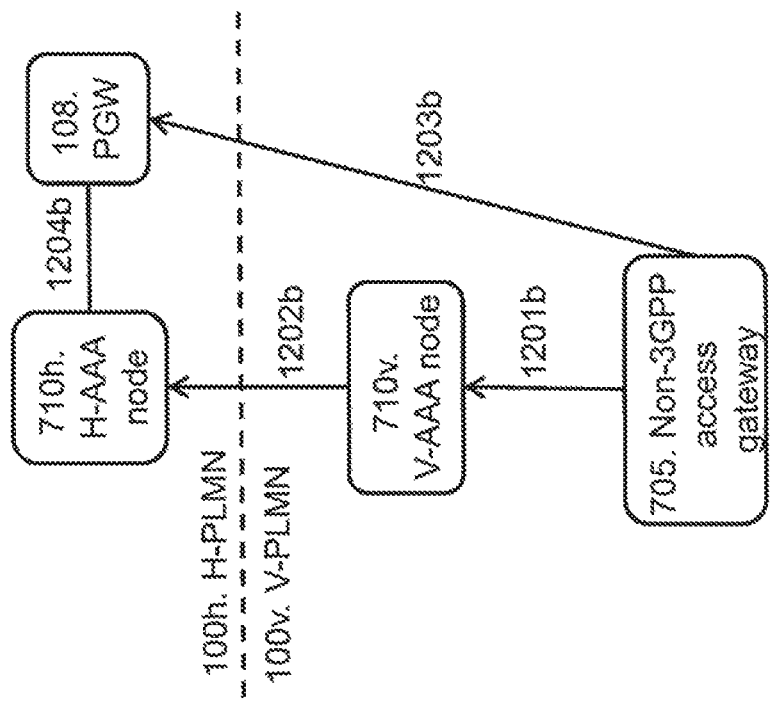
FIG. 12b is a flow chart illustrating an example embodiment of a roaming scenario where the PGW is located in the H-PLMN.
Figure 12A:
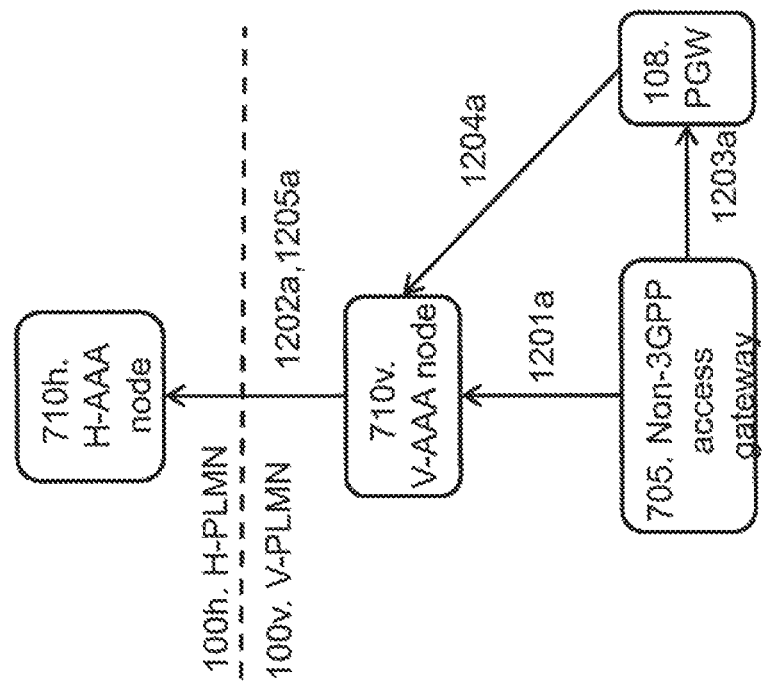
FIG. 12a is a flow chart illustrating an example embodiment of a roaming scenario where the PGW is located in the V-PLMN.

A scenario where the UE 101 is roaming (i.e. it visits the V-PLMN 100v) and two different roaming architectures will now be described in more detail with references to FIG. 12a and FIG. 12b. FIG. 12a illustrates a roaming architecture where the PGW 108 is located in the V-PLMN 100v and FIG. 12b illustrates a roaming architecture where the PGW 108 is located in the H-PLMN 100h. The identity information indicating the identity of the AAA node 710 may be different depending on the roaming architecture. The V-AAA node 710v seen in FIGS. 12a and 12b indicate is an AAA node 710 located in the V-PLMN 100v and the H-AAA node 710h is the AAA node 710 located in the H-PLMN 100h. In FIG. 12a, the identity information is the identity of the V-AAA node 710v is provided to the PGW 108 and in FIG. 12b, the identity information is the identity of the H-AAA node 710h.

The method illustrated in FIG. 12a, where the PGW is located in the V-PLMN 100v, comprises at least some of the following steps, which steps may be performed in any suitable order than described below:

FIG. 12a illustrates embodiments of a method for handling the UEs 101 access to EPC serves provided by a 3GPP network via a non-3GPP access network 103. The UE 101 requests connection to at least one EPC service via the non-3GPP access network 103 to the non-3GPP access gateway 705. The UE 101 is roaming in a V-PLMN and a PGW in the V-PLMN may be used (local breakout). The method in FIG. 12a comprises at least some of the following steps, which steps may be performed in any suitable order than described below:

Step 1201a

The non-3GPP access gateway 705 determines a V-AAA node 710v and sends the authentication request for the UE 01 to the V-AAA node 710v in the V-PLMN 100v.

Step 1202a

The V-AAA node 710v in the V-PLMN 100v acts as Diameter relay agent or as proxy and forwards the authentication request to H-AAA node 710h. More Diameter entities can be involved between 710v and 710h. The H-AAA node 710h will send an authentication answer back to the non-3GPP access gateway 705 via the V-AAA node 710v. The V-AAA node 710v can store identity information for H-AAA node 710h.

A Diameter relay agent may be described as a node used to forward a message to other Diameter nodes based on information found in the messages. A relay agent may modify messages by inserting and removing routing information, but do not modify any other portion of a message. A proxy may be described as a node which can redirect messages. A proxy may modify the message content, provide value-added services, enforce rules or perform administrative tasks etc.

Step 1203a

The non-3GPP access gateway 705 sends identity information which indicates the identity of the V-AAA node 710v to the PGW 108. The non-3GPP access gateway 705 may use the identity of the V-AAA node 710v since a local PGW in the V-PLMN 100v have been chosen to serve the UE 101.

Step 1204a

Based on the received identity information from step 1203a, the PGW 108 selects the V-AAA node 710v as AAA node. The PGW 108 can for example send the S6b authorization message to V-AAA node 710v.

Step 1205a

The V-AAA node 710v may use the identity information stored in step 1202a and forward the authorization request to the correct H-AAA node 710h.

FIG. 12b illustrates an embodiment of a method for handling the UEs 101 access to EPC serves via a non-3GPP access network 103. The UE 101 requests connection to at least one EPC service provided by the 3GPP network via the non-3GPP access network 103 to the non-3GPP access gateway 705. The UE 101 is roaming in a V-PLMN 100v and a PGW 108 in the UE H-PLMN 100h may be used (home routed). The method in FIG. 12 comprises at least some of the following steps, which steps may be performed in any suitable order than described below:

Step 1201b

The non-3GPP access gateway 705 determines a V-AAA node 710v and sends the authentication request for UE 101 to V-AAA node 710v.

Step 1202b

The AAA node 710v act as Diameter relay agent or proxy and forwards the authentication request to the H-AAA node 710h. More Diameter entities may be involved between the V-AAA node 710v and the H-AAA node 710h. The H-AAA node 710h may send an authentication answer back to the non-3GPP access gateway 705 via the V-AAA node 710v. The V-AAA node 710v may store identity information for the H-AAA node 710h.

Step 1203b

The non-3GPP access gateway 705 sends identity information which indicates the identity of the H-AAA node 710h to the PGW 108. The non-3GPP access gateway 705 may use the identity of the H-AAA node 710h since a remote PGW 108 in the H-PLMN 100h have been chosen to serve the UE 101.

Step 1204b

Based on the received identity information from step 1203b, the PGW 108 selects the H-AAA node 710h as the AAA node. The PGW 108 may for example send the S6b authorization message to the H-AAA node 710h.

Figure 13:
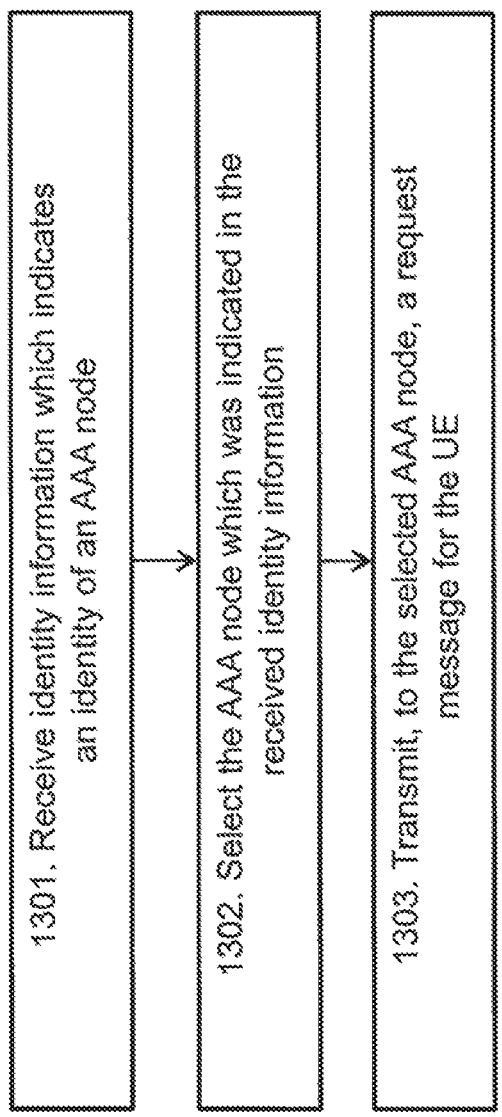
FIG. 13 is a flow chart illustrating an example embodiment of a method performed by the PGW.

The method described above will now be described seen from the perspective of the PGW 108. FIG. 13 is a flowchart describing the method performed by the PGW 108 for handling a UEs 101 access to an EPC service via a non-3GPP access network 103. The method illustrated in FIG. 13 comprises at least some of the following steps performed by the PGW 108, which steps may as well be carried out in another suitable order than described below.

Step 1301

This step corresponds to step 803 in FIG. 8, step 905 in FIG. 9, step 1006 in FIG. 10, and step 1105 in FIG. 11. During a request for connecting the UE 101 to the non-3GPP access network 103, the PGW 108 receives identity information which indicates an identity of an AAA node 710 from a non-3GPP access gateway 705.

The request for connecting the UE 101 may be an initial access of the UE 101 to the non-3GPP access network 103, or it may be a handover of the UE 101 from a 3GPP network 102 to the non-3GPP access network 103.

The AAA node 710 indicated in the received identity information may be a home AAA server when the UE 101 is roaming.

The identity information may be received in a Create Session Request message or a Proxy Binding Update message.

The identity information may be a Diameter identity of the AAA node 710.

The identity information may be received from the non-3GPP access gateway 705 via a GTP interface or a PMIP interface.

The AAA node 710 indicated in the identity information may be a visited-AAA server when the PGW 108 is comprised in a VPLM 100v, and it may be a home-AAA server when the PGW 108 is comprised in a HPLMN 100h.

Step 1302

This step corresponds to step 804 in FIG. 8, step 908 in FIG. 9, step 1008 in FIG. 10 and step 1108 in FIG. 11. The PGW 108 selects the AAA node 710 which was indicated in the received identity information.

The selected AAA node 710 may be indicated as a destination host in the authorization request message.

The AAA node 710 may be an AAA server 110 or an AAA proxy 128.

Step 1303

This step corresponds to step 805 in FIG. 8, step 909 in FIG. 9, step 1009 in FIG. 10 and step 1100 in FIG. 11. The PGW 108 transmits, to the selected AAA node 710, a request message for the UE 101. The request message is a request for authorization of the UE 101 to access the EPC service via the non-3GPP access network 103.

The request message may comprise information indicating that the PGW 108 is used by the UE 101 when accessing the EPC service via the non-3GPP access network 103.

In some embodiments, the authorization request message is transmitted to the selected AAA node 710 via a DRA.

In some embodiments, the AAA node 710 is an AAA proxy 128, and the request message is transmitted to the selected AAA node 710 for further transmission to an AAA server 110.

Figure 14:
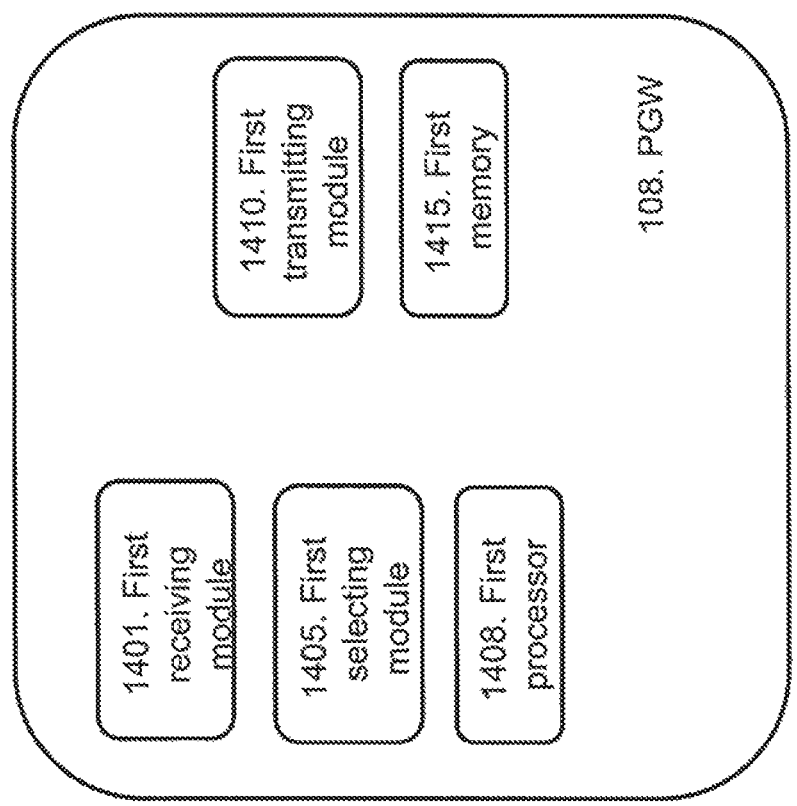
FIG. 14 is a schematic block diagram illustrating an example embodiment of the PGW.

To perform the method steps shown in FIG. 13 for handling a UEs access to an EPC service via a non-3GPP access network 103, the PGW 108 may comprise an arrangement as shown in FIG. 14.

To perform the method steps shown in FIG. 13 for handling a UEs access to an EPC service via a non-3GPP access network 103, the PGW 108 is adapted to, e.g. by means of a first receiving module 1401, during a request for connecting the UE 101 to the non-3GPP access network 103, receive identity information which indicates an identity of an AAA node 710 from a non-3GPP access gateway 705. The first receiving module 1401 may also be referred to as a first receiving unit, a first receiving means, a first receiving circuit, first means for receiving, first input unit etc. The first receiving module 1401 may be a receiver, a transceiver etc. The first receiving module 1401 may be a wireless receiver of the PGW 108 of a wireless or fixed communications system.

The request for connecting the UE 101 may be an initially access of the UE 101 to the non-3GPP network 103, or it may be a handover of the UE 101 from a 3GPP network 102 to the non-3GPP access network 103. The AAA node 710 indicated in the received identity information may be a home AAA server when the UE 101 is roaming. The identity information may be received in a Create Session Request message or a Proxy Binding Update message. The identity information may be a Diameter identity of the AAA node 710. The AAA node 710 may be an AAA server 110 or an AAA proxy 128. In some embodiments, the identity information is received from the non-3GPP access gateway 705 via a GTP interface or via a PMIP interface. In some embodiments, the AAA node 710 indicated in the identity information is a visited-AAA server when the PGW 108 is comprised in a VPLMN 100v, and a home-AAA server when the PGW 108 is comprised in a HPLMN 100h.

The PGW 108 is adapted to, e.g. by means of a first selecting module 1405, select the AAA node 710 which was indicated in the received identity information. The first selecting module 1405 may also be referred to as a first selecting unit, a first selecting means, a first selecting circuit, first means for selecting, etc. The first selecting module 1405 may be a first processor 1408 of the PGW 108.

The PGW 108 is adapted to, e.g. by means of a first transmitting module 1410, transmit, to the selected AAA node 710, a request message for the UE 101. The request message is a request for authorization of the UE 101 to access the EPC service via the non-3GPP access network 103. The first transmitting module 1410 may also be referred to as a first transmitting unit, a first transmitting means, a first transmitting circuit, first means for transmitting, first output unit etc. The first transmitting module 1410 may be a transmitter, a transceiver etc. The first transmitting module 1410 may be a wireless transmitter of the PGW 108 of a wireless or fixed communications system.

The request message may comprise information indicating that the PGW 108 is used by the UE 101 when accessing the EPC service via the non-3GPP access network 103. The authorization request message may be transmitted to the selected AAA node 710 via a DRA.

In some embodiments, the selected AAA node 710 is indicated as a destination host in the authorization request message.

In some embodiments, the AAA node 710 is an AAA proxy 128, and then the request message may be transmitted to the selected AAA node 710 for further transmission to an AAA server 110.

In some embodiments, the PGW 108 comprises the first processor 1408 and a first memory 1410. The first memory 1410 comprises instructions executable by the first processor 1408. The first memory 1410 comprises one or more memory units. The first memory 1410 is arranged to be used to store data, received data streams, power level measurements, identity information, request messages, response messages, destination host, threshold values, time periods, configurations, schedulings, and applications to perform the methods herein when being executed in the PGW 108.

Those skilled in the art will also appreciate that the first receiving module 1401, the first selecting module 1405 and the first transmitting module 1410 described above may refer to a combination of analog and digital circuits, and/or one or more processors configured with software and/or firmware, e.g. stored in a memory, that when executed by the one or more processors such as the first processor 1408 perform as described above. One or more of these processors, as well as the other digital hardware, may be included in a single Application Specific integrated Circuit (ASIC), or several processors and various digital hardware may be distributed among several separate components, whether individually packaged or assembled into a System-on-a-Chip (SoC).

In some embodiments, a first computer program may comprise instructions which, when executed on at least one processor, cause the at least one processor (e.g. the processor 1408) to carry out at least some of the method steps in FIGS. 8-13. A first carrier may comprise the first computer program, and the first carrier is one of an electronic signal, optical signal, radio signal or computer readable storage medium.

Figure 15:
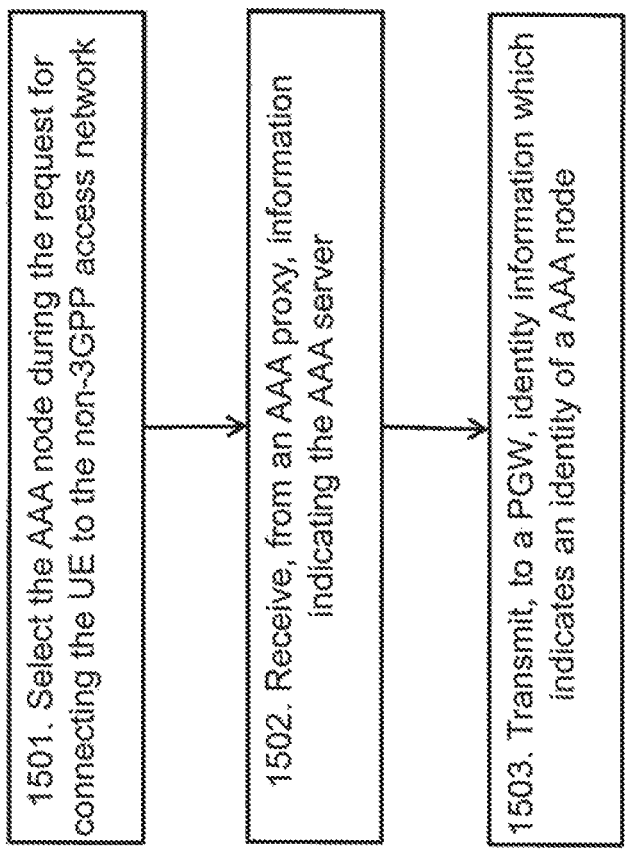
FIG. 15 is a flow chart illustrating an example embodiment of a method performed by the non-3GPP access gateway.

The method described above will now be described seen from the perspective of the non-3GPP access gateway 705. FIG. 15 is a flowchart describing the method performed by the non-3GPP access gateway 705 for handling a UEs access to an EPC service via a non-3GPP access network 103. The non-3GPP access gateway 705 may be an ePDG 125 or a TWAG or a MAG. The method illustrated in FIG. 15 comprises at least some of the following steps performed by the non-3GPP access gateway 705, which steps may as well be carried out in another suitable order than described below.

Step 1501

This step corresponds to step 802 in FIG. 8, step 902 in FIG. 9 and step 1002 in FIG. 10. In some embodiments, the non-3GPP access gateway 705 selects the AAA node 710 during the request for connecting the UE 101 to the non-3GPP access network 103. The non-3GPP access network 103 may be a trusted non-3GPP access network 104 or an untrusted non-3GPP access network 105.

Step 1502

This step corresponds to step 802 in FIG. 8 and step 1104 in FIG. 11. In some embodiments, when the AAA node 710 is an AAA server 110, the non-3GPP access gateway 705 receives, from an AAA proxy 128, information indicating the AAA server 110. The AAA server 110 is comprised in a HPLMN 100h or a VPLMN 100v of the UE 101.

Step 1503

This step corresponds to step 803 in FIG. 8, step 905 in FIG. 9 step 1005 in FIG. 10 and step 1105 in FIG. 11. During a request for connecting the UE 101 to the non-3GPP access network 103, the non-3GPP access gateway 705 transmits, to a PGW 108, identity information which indicates an identity of an AAA node 710.

The identity information may be transmitted in a Create Session request message or in a Proxy Binding Update message. The identity information may be a Diameter identity of the AAA node 710. The identity information may be transmitted from the non-3GPP access gateway 705 to the PGW 108 via a GTP interface or via a PMIP interface.

Figure 16:
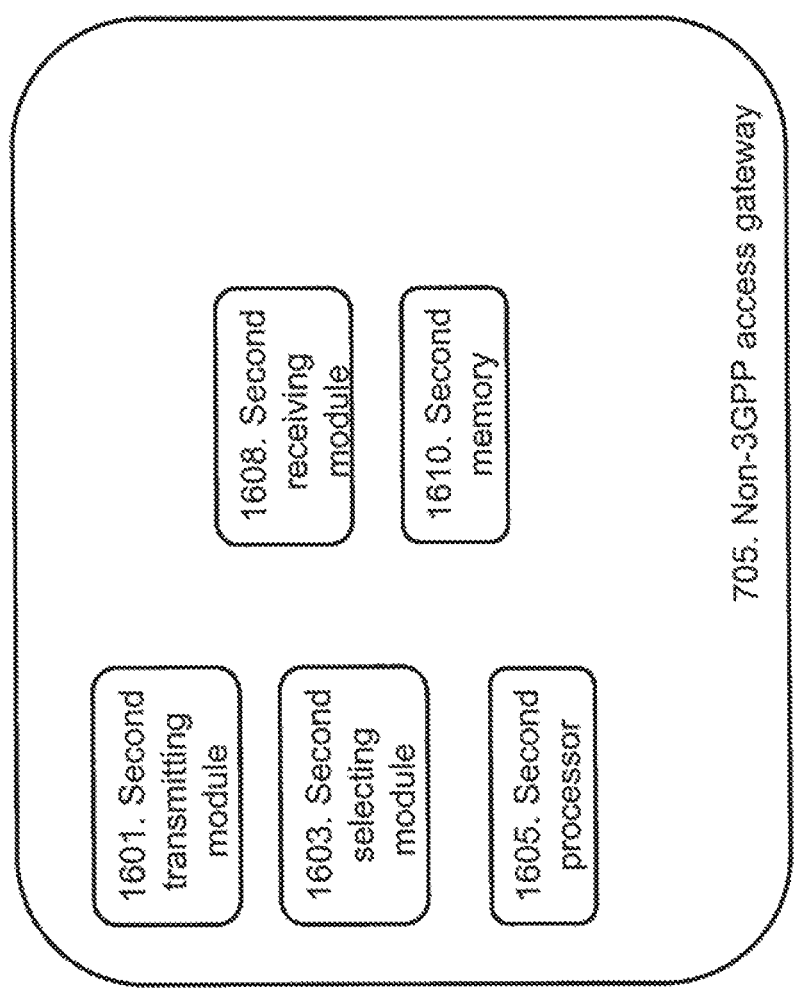
FIG. 16 is a schematic block diagram illustrating an example embodiment of the non-3GPP access gateway.

To perform the method steps shown in FIG. 15 for handling a UEs access to an EPC service via a non-3GPP access network 103, the non-3GPP access gateway 705 may comprise an arrangement as shown in FIG. 16. As mentioned above, the non-3GPP access gateway 705 may be an ePDG 125 or a TWAG or a MAG. The non-3GPP network 103 may be a trusted non-3GPP network 104 or an untrusted non-3GPP network 105.

To perform the method steps shown in FIG. 15 for handling a UEs access to an EPC service via a non-3GPP access network 103, the non-3GPP access gateway 705 is adapted to, e.g. by means of a second transmitting module 1601, during a request for connecting the UE 101 to the non-3GPP access network 103, transmit, to a PGW 108, identity information which indicates an identity of a AAA node 710. The second transmitting module 1601 may also be referred to as a second transmitting unit, a second transmitting means, a second transmitting circuit, second means for transmitting, second output unit etc. The second transmitting module 1601 may be a transmitter, a transceiver etc. The second transmitting module 1601 may be a wireless transmitter of the non-3GPP access gateway 705 of a wireless or fixed communications system.

The identity information may be transmitted in a Create Session request message or a Proxy Binding Update message.

The identity information may be transmitted from the non-3GPP access gateway 705 to the PGW 108 via a GTP interface or via a PMIP interface.

The non-3GPP access gateway 705 may be adapted to, e.g. by means of a second selecting module 1603, select the AAA node 710 during the request for connecting the UE 101 to the non-3GPP access network 103. The second selecting module 1603 may also be referred to as a second selecting unit, a second selecting means, a second selecting circuit, second means for selecting etc. The second selecting module 1603 may be a second processor 1605 of the non-3GPP access gateway 705.

In some embodiments, the non-3GPP access gateway 705 is adapted to, e.g. by means of a second receiving module 1608, receive, from an AAA proxy 128, information indicating the AAA server 110. The AAA server 110 is comprised in a HPLMN 100h or a VPLMN 100v of the UE 101. This may be the case when the AAA node 710 is an AAA server 110. The second receiving module 1608 may also be referred to as a second receiving unit, a second receiving means, a second receiving circuit, second means for receiving, second input unit etc. The second receiving module 1608 may be a receiver, a transceiver etc. The second receiving module 1608 may be a wireless receiver of the non-3GPP access gateway 705 of a wireless or fixed communications system.

The identity information may be a Diameter identity of the AAA node 710.

In some embodiments, the non-3GPP access gateway 705 comprises the second processor 1605 and a second memory 1610. The second memory 1610 comprises instructions executable by the second processor 1605. The second memory 1610 comprises one or more memory units. The second memory 1610 is arranged to be used to store data, received data streams, power level measurements, identity information, request messages, response messages, destination host, threshold values, time periods, configurations, schedulings, and applications to perform the methods herein when being executed in the non-3GPP access gateway 705.

Those skilled in the art will also appreciate that the second transmitting module 1601, the second selecting module 1603 and the second receiving module 1608 described above may refer to a combination of analog and digital circuits, and/or one or more processors configured with software and/or firmware, e.g. stored in a memory, that when executed by the one or more processors such as the second processor 1605 perform as described above. One or more of these processors, as well as the other digital hardware, may be included in a single ASIC, or several processors and various digital hardware may be distributed among several separate components, whether individually packaged or assembled into a SoC.

In some embodiments, a second computer program may comprise instructions which, when executed on at least one processor, cause the at least one processor (e.g. the second processor 1605 to carry out at least some of the method steps in FIGS. 8-12 and 15. A second carrier may comprise the second computer program, and the second carrier is one of an electronic signal, optical signal, radio signal or computer readable storage medium.

The present mechanism for handling a UEs access to an EPC service via a non-3GPP access network 103 may be implemented through one or more processors, such as a first processor 1408 in the PGW arrangement depicted in FIG. 14 and a second processor 1605 in the non-3GPP access gateway arrangement depicted in FIG. 16, together with computer program code for performing the functions of the embodiments herein. The processor may be for example a Digital Signal Processor (DSP), ASIC processor, Field-programmable gate array (FPGA) processor or microprocessor. The program code mentioned above may also be provided as a computer program product, for instance in the form of a data carrier carrying computer program code for performing the embodiments herein when being loaded into at least one of the PGW 108 and the non-3GPP access gateway 705. One such carrier may be in the form of a CD ROM disc. It is however feasible with other data carriers such as a memory stick. The computer program code can furthermore be provided as pure program code on a server and downloaded to at least one of the PGW 108 and the non-3GPP access gateway 705.

Summarized, the embodiments herein relate to that the non-3GPPG access gateway 710 provides the PGW 108 with the identity of the AAA node selected for access authentication and authorization during connection setup. The PGW 108 then can select the same AAA node to initiate authorization procedure for the non-3GPP connection request. The embodiments herein may avoid the re-direct procedure in case the non-3GPP access gateway 710 and the PGW 108 select different AAA nodes during the non-3GPP connection setup, and thus reduce the time delay of non-3GPP connection setup and network traffic load.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

What is claimed is:

1. A method performed by a Packet data network GateWay (PGW) for handling a user equipment's (UE's) access to an Evolved Packet Core (EPC) service via a non-third Generation Partnership Project (non-3GPP) access network, wherein the PGW comprises a transmitter and a receiver, the method comprising:
    during a request for connecting the UE to access the EPC service via the non-3GPP access network, the PGW employing the receiver to receive a Create Session Request message transmitted by an access gateway in communication with the UE via the non-3GPP access network, wherein the Create Session Request message that was transmitted by the access gateway comprises an Authentication Authorization Accounting (AAA) server name; and
    after receiving the Create Session Request message transmitted by the access gateway, the PGW employing a transmitter to transmit an authorization request message for the UE to an AAA server associated with the AAA server name, wherein the authorization request message is a request for authorization of the UE to access the EPC service via the non-3GPP access network.

2. The method of claim 1, wherein the authorization request message comprises information indicating that the PGW is used by the UE when accessing the EPC service via the non-3GPP access network.

3. The method of claim 1, wherein the request for connecting the UE is an initial access of the UE to the non-3GPP access network, or a handover of the UE from a 3GPP network to the non-3GPP access network.

4. The method of claim 1, wherein the AAA server is a home AAA server when the UE is roaming.

5. The method of claim 1, wherein the Create Session Request message further comprises an Access Point Name (APN).

6. The method of claim 1, wherein the AAA serve name is a fully qualified domain name (FQDN).

7. The method of claim 1, wherein the authorization request message is transmitted to the AAA server via a Diameter Routing Agent.

8. The method of claim 1, wherein the AAA server is indicated as a destination host in the authorization request message.

9. The method of claim 1, wherein the AAA server is an AAA proxy, and wherein the authorization request message is transmitted to the AAA server for further transmission to an AAA server.

10. The method of claim 1, wherein the Create Session Request message is received from the access gateway via a General packet radio services Tunneling Protocol interface or a Proxy Mobile Internet Protocol interface.

11. The method of claim 1, wherein the AAA server is a visited-AAA server when the PGW is comprised in a Visited Public Land Mobile Network, and a home-AAA server when the PGW is comprised in a Home Public Land Mobile Network.

12. A method performed by an access gateway for handling a user equipment's (UE's) access to an Evolved Packet Core (EPC) service via a non-3GPP access network, wherein the access gateway comprises a transmitter and a receiver, the method comprising:
the access gateway employing the receiver to receive, via the non-3GPP access network, a message transmitted by the UE; and
after receiving the message transmitted by the UE, the access gateway employing the transmitter to transmit to a Packet data network GateWay (PGW) a Create Session Request message comprising an Authentication Authorization Accounting (AAA) server name.

13. The method of claim 12, further comprising:
after receiving the message transmitted by the UE and before employing the transmitter to transmit the Create Session Request message to the PGW, the access gateway selecting an AAA server, wherein
the AAA server name included in the Create Session Request identifies the AAA server selected by the access gateway.

14. The method of claim 12, wherein the method further comprises:
receiving, from an AAA proxy, information indicating the AAA server, wherein the AAA server is comprised in a Home Public Land Mobile Network or a Visited Public Land Mobile Network of the UE.

15. The method of claim 12, wherein the Create Session Request message is transmitted from the access gateway to the PGW via a General packet radio services Tunneling Protocol interface or via a Proxy Mobile Internet Protocol interface.

16. The method of claim 12, wherein
the access gateway is an Evolved Packet Data Gateway (ePDG), and
the message transmitted by the UE is related to an Internet Key Exchange version 2 (IKEv2) tunnel establishment procedure.

17. The method of claim 16, wherein
the Create Session Request message further comprises an Access Point Name (APN).

18. A Packet data network GateWay (PGW) adapted to handle a user equipment's (UE's) access to an Evolved Packet Core (EPC) service via a non-Third Generation Partnership Project (non-3GPP) access network, the PGW comprising:

a transmitter;
a receiver for receiving, during a request for connecting the UE to access the EPC service via the non-3GPP access network, a Create Session Request message transmitted by an access gateway in communication with the UE via the non-3GPP access network, wherein the Create Session Request message comprise an Authentication Authorization Accounting (AAA) server name; and
processing circuitry configured such that after the PGW receives the Create Session Request message that was transmitted by the access gateway, the PGW employs the transmitter to transmit an authorization request message for the UE to an AAA server associated with the AAA server name, wherein the authorization request message is a request for authorization of the UE to access the EPC service via the non-3GPP access network.

19. The PGW according to claim 18, wherein the authorization request message comprises information indicating that the PGW is used by the UE when accessing the EPC service via the non-3GPP access network.

20. The PGW according to claim 18, wherein the request for connecting the UE is an initially access of the UE to the non-3GPP access network, or a handover of the UE from a 3GPP network to the non-3GPP access network.

21. The PGW according to claim 18, wherein the AAA server is indicated as a destination host in the authorization request message.

22. An access gateway for handling a user equipment's (UE's) access to an Evolved Packet Core (EPC) service via a non-3GPP access network, the access gateway comprising:
a receiver for receiving, via the non-3GPP access network, a message transmitted by the UE;
a transmitter; and
processing circuitry configured such that, after the access gateway receives, via the non-3GPP access network, the message transmitted by the UE, the access gateway employs the transmitter to transmit to a packet data network gateway (PGW) a Create Session Request message comprising an Authentication Authorization Accounting (AAA) server name.

23. The access gateway according to claim 22, being further configure such that:
after receiving the message transmitted by the UE and before employing the transmitter to transmit the Create Session Request message to the PGW, the access gateway selects an AAA server, wherein
the identity information included in the Create Session Request identifies the AAA server selected by the access gateway.

24. The access gateway according to claim 22, wherein the access gateway is further configured to:
receive, from an AAA proxy, information indicating the AAA server, wherein the AAA server is comprised in a Home Public Land Mobile Network or a Visited Public Land Mobile Network of the UE.

25. A method performed by a Packet data network GateWay (PGW) for handling a user equipment's (UE's) access to an Evolved Packet Core (EPC) service via a non-third Generation Partnership Project (non-3GPP) access network, the method comprising:
the PGW receiving a Create Session Request message that was transmitted by an access gateway, wherein the Create Session Request message comprises i) an Authentication Authorization Accounting (AAA)

server name and ii) an Access Point Name (APN), wherein the APN is separate from the AAA server name; and after receiving the Create Session Request, the PGW transmitting an authorization request message for the UE to an AAA server associated with the AAA server name; and after employing the transmitter to transmit the authorization request message, the PGW transmitting to the access gateway a Create Session Response message.

* * * * *